US012777282B2

(12) United States Patent
Mathew et al.

(10) Patent No.: US 12,777,282 B2
(45) Date of Patent: Oct. 27, 2026

(54) SPATIAL AUDIO PROCESSING FOR SPEAKERS ON HEAD-MOUNTED DISPLAYS

(71) Applicant: Magic Leap, Inc., Plantation, FL (US)

(72) Inventors: Justin Dan Mathew, Fort Lauderdale, FL (US); Mark Brandon Hertensteiner, Brokern Arrow, OK (US); Lukasz Januszkiewicz, Poznan (PL)

(73) Assignee: Magic Leap, Inc., Plantation, FL (US)

( * ) Notice: Subject to any disclaimer, the term of this patent is extended or adjusted under 35 U.S.C. 154(b) by 32 days.

(21) Appl. No.: 18/871,121

(22) PCT Filed: Jun. 3, 2022

(86) PCT No.: PCT/US2022/032229
§ 371 (c)(1),
(2) Date: Dec. 2, 2024

(87) PCT Pub. No.: WO2023/234949
PCT Pub. Date: Dec. 7, 2023

(65) Prior Publication Data
US 2026/0247072 A1 Aug. 20, 2026

(51) Int. Cl.
*H04R 3/04* (2006.01)
*H04R 29/00* (2006.01)
*H04S 7/00* (2006.01)

(52) U.S. Cl.
CPC ............ *H04R 3/04* (2013.01); *H04R 29/001* (2013.01); *H04S 7/307* (2013.01); *H04R 2430/20* (2013.01); *H04R 2499/15* (2013.01); *H04S 7/301* (2013.01); *H04S 2420/01* (2013.01)

(58) Field of Classification Search
None
See application file for complete search history.

(56) References Cited

U.S. PATENT DOCUMENTS

2015/0078596 A1 3/2015 Sprogis
2020/0068332 A1 2/2020 Goldberg et al.
2021/0144475 A1 * 5/2021 Carlsson ................ H04S 7/307
2022/0021996 A1 1/2022 Brimijoin, II et al.

OTHER PUBLICATIONS

PCT International Search Report and Written Opinion for International Appln. No. PCT/US22/32229, Applicant Magic Leap, Inc., dated Sep. 22, 2022.
PCT International Preliminary Report on Patentability for International Appln. No. PCT/US22/32229, Applicant Magic Leap, Inc., dated Nov. 7, 2024.

* cited by examiner

*Primary Examiner* — Antim G Shah
(74) *Attorney, Agent, or Firm* — Vista IP Law Group, LLP

(57) ABSTRACT

A computer implemented method for generating audio for use with a head-mounted display system includes obtaining a frequency response data of a speaker coupled to the head-mounted display system. The method also includes comparing the frequency response data of the speaker with a target speaker response. The method further includes computing a coefficient for a filter system based on a result of comparing the frequency response data of the speaker with the target speaker response. Moreover, the method includes generating the audio using the filter system and the coefficient to compensate for a characteristic of the speaker.

9 Claims, 23 Drawing Sheets

SPATIAL AUDIO PROCESSING FOR SPEAKERS ON HEAD-MOUNTED DISPLAYS

CROSS-REFERENCE TO RELATED APPLICATIONS

This application claims priority to PCT Application No. PCT/US22/32229, filed on Jun. 3, 2022. U.S. patent application Ser. No. 15/423,415 filed on Feb. 2, 2017 and issued as U.S. Pat. No. 10,536,783 on Jan. 14, 2020, U.S. patent application Ser. No. 15/666,210 filed on Aug. 1, 2017 and issued as U.S. Pat. No. 10,390,165 on Aug. 20, 2019, and U.S. patent application Ser. No. 15/703,946 filed on Sep. 13, 2017 and issued as U.S. Pat. No. 10,448,189 on Oct. 15, 2019. The contents of the patent applications and patents mentioned herein are hereby expressly and fully incorporated by reference in their entirety, as though set forth in full. Described in the aforementioned incorporated patent applications and patents are various embodiments of extended reality systems and methods including spatial audio systems and methods. Described herein are further embodiments of extended reality systems and methods including spatial audio systems and methods.

FIELD OF THE INVENTION

The present disclosure relates to extended reality systems and methods including spatial audio systems and methods. In particular, the present disclosure relates to systems and methods for processing spatial audio for speakers on head-mounted displays.

BACKGROUND

Modern computing and display technologies have facilitated the development of display systems for so called "mixed reality" ("MR"), "virtual reality" ("VR") and/or "augmented reality" ("AR") experiences. Together, these experiences are known as "extended reality" ("XR"). XR experiences can be provided by presenting computer-generated imagery to the user through a head-mounted display. This imagery creates a sensory experience which immerses the user in the simulated environment. A VR scenario typically involves presentation of digital or virtual image information without transparency to actual real-world visual input.

AR systems generally supplement a real-world environment with simulated elements. For example, AR systems may provide a user with a view of the surrounding real-world environment via a head-mounted display. However, computer-generated imagery can also be presented on the display to enhance the real-world environment. This computer-generated imagery can include elements which are contextually-related to the real-world environment. Such elements can include simulated text, images, objects, etc. MR systems also introduce simulated objects into a real-world environment, but these objects typically feature a greater degree of interactivity than in AR systems. The simulated elements can often times be interactive in real time. XR scenarios can be presented with spatial audio to improve user experience.

Current spatial audio systems can cooperate with 3-D optical systems, such as those in XR systems, to render, both optically and sonically, virtual objects. Objects are "virtual" in that they are not real physical objects located in respective positions in three-dimensional space. Instead, virtual objects only exist in the brains (e.g., the optical and/or auditory centers) of viewers and/or listeners when stimulated by light beams and/or soundwaves respectively directed to the eyes and/or ears of audience members. Unfortunately, the listener position and orientation requirements of current spatial audio systems limit their ability to create the audio portions of virtual objects in a realistic manner for out-of-position listeners.

Current spatial audio systems, such as those for home theaters and video games, utilize the "5.1" and "7.1" formats. A 5.1 spatial audio system includes left and right front channels, left and right rear channels, a center channel and a subwoofer. A 7.1 spatial audio system includes the channels of the 5.1 audio system and left and right channels aligned with the intended listener. Each of the above-mentioned channels corresponds to a separate speaker. Cinema audio systems and cinema grade home theater systems include DOLBY ATMOS, which adds channels configured to be delivered from above the intended listener, thereby immersing the listener in the sound field and surrounding the listener with sound.

Spatial audio systems integrated into head-mounted displays are intended to send spatial auditory cues (e.g., interaural time and level differences) embedded in audio to the left and right ear of a user. Known spatial audio rendering engines that use binaural rendering techniques are normally designed for playback on headphones or earbuds where the speaker transducer is very close to or inside the ear canal to bypass anthropometric effects of the listener. This design is consistent with the common practice of generating spatial audio perceptual filters (e.g., Head-Related Transfer Function or "HRTFs") with microphones placed in a mannequin or an individual's ear, which takes into account the head and ear pinnae reflections into the audio measurements at the microphone. As a result, in order to generate accurate spatial audio using the audio perceptual filters, the speaker transducer of a headphone or an earbud must be close to or in the ear canal in order to bypass the listener's own head and ear pinnae reflections as that information was already included when generating the audio perceptual filter (e.g., HRTF).

In some embodiments of spatial audio systems, speakers are placed on the side of the head-mounted display at a specific non-zero distance from the ear. For instance, on head-mounted displays with integrated speakers on the sides, such as AR/VR/XR/Bluetooth Glasses/etc., the speaker transducer is typically located at a certain non-zero distance from the entrance of a user's ear canal. In these embodiments, the head and ear shape of the user can alter the sound that travels from the speaker to the ear. By default, the sound generated by the speaker transducer will arrive at the entrance of the user's ear canal with reflections from the side of the user's head and the user's ear pinnae interfering the direct path from the speaker transducer to the user's ear. As a result, the spatial auditory cues embedded in the sound can be altered causing incorrect perception of the intended direction of the sound.

With incorrect perception of the intended direction of the sound, spatial audio associated with a XR experience may lead to the cognitive dissonance when a virtual sound (e.g., a chirp) appears to emanate from a location different from the image of the virtual object (e.g., a bird). For instance, if a virtual bird is located to the right of the listener, the chirp should appear to emanate from the same point in space instead of from a different point in space. Despite improvements in spatial audio systems, current spatial audio systems are not capable of taking into account speaker transducing characteristics, the head and ear shape of the user, and their effect on sound generated by speaker transducers located at a non-zero distance from a user's ear.

SUMMARY

In one embodiment, a computer implemented method for generating audio for use with a head-mounted display system includes obtaining a frequency response data of a speaker coupled to the head-mounted display system. The method also includes comparing the frequency response data of the speaker with a target speaker response. The method further includes computing a coefficient for a filter system based on a result of comparing the frequency response data of the speaker with the target speaker response. Moreover, the method includes generating the audio using the filter system and the coefficient to compensate for a characteristic of the speaker.

In one or more embodiments, the audio may be spatial audio. The filter system may be a parallel Infinite Impulse Response (IIR)—Finite Impulse Response (FIR) filter system. The method may include measuring or simulating the frequency response data of the speaker. The method may include applying a frequency transform or a smoothing transform to the frequency response data of the speaker. Comparing the frequency response data of the speaker with the target speaker response may include processing the frequency response data of the speaker and the target speaker response with a peak and notch detector. The method may also include presenting sound based on the audio.

In one or more embodiments, the method also includes comparing the frequency response data of the speaker with a known speaker transducer frequency response data. The method further includes generating a list of affected frequency poles based on a result of comparing the frequency response data with the known speaker transducer frequency response data. Moreover, the method includes computing a coefficient for a filter system based on the list of affected frequency poles. In addition, the method includes generating the audio using the filter system and the coefficient to reduce an anthropometric effect on the audio.

In another embodiment, a computer implemented method for generating audio for use with a head-mounted display system includes obtaining a frequency response data of a speaker coupled to the head-mounted display system. The method also includes comparing the frequency response data of the speaker with a known speaker transducer frequency response data. The method further includes generating a list of affected frequency poles based on a result of comparing the frequency response data with the known speaker transducer frequency response data. Moreover, the method includes computing a coefficient for a filter system based on the list of affected frequency poles. In addition, the method includes generating the audio using the filter system and the coefficient to reduce an anthropometric effect on the audio.

In one or more embodiments, the audio may be spatial audio. The frequency response data may include the anthropometric effect corresponding to an ear of a user. The filter system may be a parallel Infinite Impulse Response (IIR)—Finite Impulse Response (FIR) filter system. The method may include measuring or simulating the frequency response data for the speaker. The method may include applying a frequency transform or a smoothing transform to the frequency response data for the speaker. Comparing the frequency response data for the speaker with the known speaker transducer frequency response data may include processing the frequency response data for the speaker and the target speaker response with a peak and notch detector In one or more embodiments, the list of affected frequency poles includes a list of frequency poles, and respective anthropometric effects for each of the frequency poles in the list of frequency poles. An anthropometric effect of the respective anthropometric effects may include attenuation or amplification, and a magnitude of the attenuation or the amplification. The anthropometric effect may include a reflection effect corresponding to an ear or a head of a user. The method may also include presenting sound based on the audio.

In yet another embodiment, a computer implemented method for generating audio for use with a head-mounted display system includes obtaining left audio response data of a left speaker coupled to the head-mounted display system. The method also includes obtaining right audio response data of a right speaker coupled to the head-mounted display system. The method further includes generating a regularization curve based on the left and right audio response data for the respective left and right speakers, and known speaker audio response data. Moreover, the method includes computing a filter based on the regularization curve. In addition, the method also includes generating the audio using the filter to reduce an anthropometric crosstalk of the audio.

In one or more embodiments, the audio may be spatial audio. The left audio response data may include a response of the left speaker to the left ear, and a response of the left speaker to the right ear. The right audio response data may include a response of the right speaker to the right ear, and a response of the right speaker to the left ear. The left and right audio response data may be frequency or impulse response data. The method may include measuring or simulating the left and right audio response data for the respective left and right speakers. The method may include generating an XTC filter matrix. The anthropometric effect may include a crosstalk effect corresponding to the left speaker and the right ear. The anthropometric effect may include a crosstalk effect corresponding to the right speaker and the left ear. The method may also include presenting sound based on the audio.

In still another embodiment, a computer implemented method for generating audio for use with a head-mounted display system includes obtaining a frequency response data of a speaker coupled to the head-mounted display system. The method also includes comparing the frequency response data of the speaker with a target speaker response. The method further includes computing a first coefficient for a first filter system based on a result of comparing the frequency response data of the speaker with the target speaker response. Moreover, the method includes comparing the frequency response data of the speaker with a known speaker transducer frequency response data. In addition, the method includes generating a list of affected frequency poles based on a result of comparing the frequency response data with the known speaker transducer frequency response data. The method also includes computing a second coefficient for a second filter system based on the list of affected frequency poles. The method further includes obtaining left audio response data of a left speaker coupled to the head-mounted display system. Moreover, the method includes obtaining right audio response data of a right speaker coupled to the head-mounted display system. In addition, the method includes generating a regularization curve based on the left and right audio response data for the respective left and right speakers, and known speaker audio response data. The method also includes computing a third filter based on the regularization curve. The method further includes generating the audio using the first filter system and the first coefficient to compensate for a characteristic of the speaker, using the second filter system and the second coefficient to reduce an anthropometric effect on the audio, and using the third filter to reduce an anthropometric crosstalk of the audio.

In one or more embodiments, the audio may be spatial audio.

BRIEF DESCRIPTION OF THE DRAWINGS

The drawings illustrate the design and utility of various embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
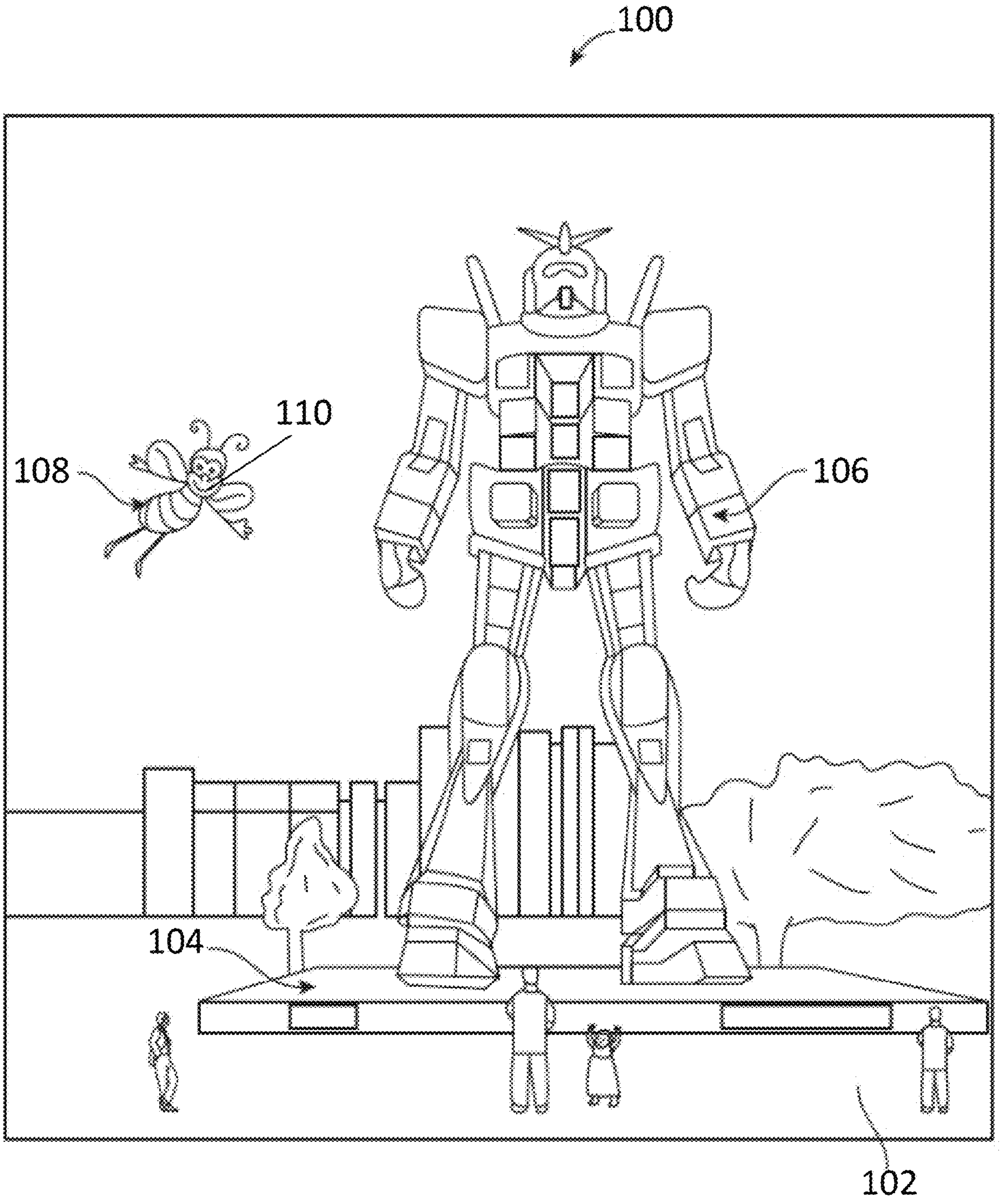
FIG. 1 depicts a user's view of augmented reality/mixed reality through a wearable XR user device according to some embodiments.

Various embodiments of the invention are directed to systems, methods, and articles of manufacture for spatial audio systems in a single embodiment or in multiple embodiments. Other objects, features, and advantages of the invention are described in the detailed description, figures, and claims.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

The spatial audio systems may be implemented independently of XR systems, but many embodiments below are described in relation to XR systems for illustrative purposes only.

Summary of Problems and Solutions

Spatial audio systems, such as those for use with or forming parts of XR systems, render, present and emit spatial audio corresponding to virtual objects with locations in real-world, physical, 3-D space and/or virtual space. As used in this application, "generating," "delivering," "emitting," "producing" or "presenting" audio or sound includes, but is not limited to, causing formation of sound waves that may be perceived by the human auditory system as sound (including sub-sonic low frequency sound waves). These virtual locations are typically "known" to (i.e., recorded in) the spatial audio system using a coordinate system (e.g., a coordinate system with the spatial audio system at the origin and a known orientation relative to the spatial audio system). Virtual audio sources associated with virtual objects have content, position and orientation. Another characteristic of virtual audio sources is volume, which falls off as a square of the distance from the listener. However, current spatial audio systems do not account for speaker characteristics and head and ear pinnae reflection that naturally occurs when placing speaker transducers on the side of head-mounted displays and at non-zero distances from a user's ear.

Spatial audio systems described herein address these issues by compensating for speaker characteristics and head and ear pinnae reflection in order to ensure delivery of accurate spatial auditory cues to a user's ear. The embodiments include systems and methods that automatically generate one or more speaker equalization filters in order to remove speaker characteristics from the audio playback, and one or more filters that compensates for reflection from a user's head and ear when generating spatial audio for delivery through speaker transducers on the side of head-mounted displays. This ensures accurate spatial auditory cues and minimize cognitive dissonance arising from mismatch between spatial auditory cues and visual cues.

Spatial Audio Systems

XR scenarios often include presentation of images and sound corresponding to virtual objects in relationship to real-world objects. For example, referring to FIG. 1, an augmented reality scene 100 is depicted wherein a user of an XR technology sees a real-world, physical, park-like setting 102 featuring people, trees, buildings in the background, and a real-world, physical concrete platform 104. In addition to these items, the user of the XR technology also perceives that he "sees" a virtual robot statue 106 standing upon the real-world, physical platform 104, and a virtual cartoon-like avatar character 108 flying by which seems to be a personification of a bumblebee, even though these virtual objects 106, 108 do not exist in the real world.

In order to present a believable or passable XR scene 100, the virtual objects (e.g., the robot statue 106 and the bumblebee 108) may have synchronized spatial audio respectively associated therewith. For instance, mechanical sounds associated with the robot statue 106 may be generated so that they appear to emanate from the virtual location corresponding to the robot statue 106. Similarly, a buzzing sound associated with the bumblebee 108 may be generated so that they appear to emanate from the virtual location corresponding to the bumblebee 108.

The spatial audio may have an orientation in addition to a position. For instance, a "cartoonlike" voice associated with the bumblebee 108 may appear to emanate from the mouth 110 of the bumblebee 108. While the bumblebee 108 is facing the viewer/listener in the scenario depicted in FIG. 1, the bumblebee 108 may be facing away from the viewer/listener in another scenario such as one in which the viewer/listener has moved behind the virtual bumblebee 108. In that case, the voice of the bumblebee 108 would be rendered as a reflected sound off of other objects in the scenario (e.g., the robot statue 106).

In some embodiments, virtual sound may be generated so that it appears to emanate from a real physical object. For instance, virtual bird sound may be generated so that it appears to originate from the real trees in the XR scene 100. Similarly, virtual speech may be generated so that it appears to originate from the real people in the XR scene 100. In an XR conference, virtual speech may be generated so that it appears to emanate from a real person's mouth. The virtual speech may sound like the real person's voice or a completely different voice. In one embodiment, virtual speech may appear to emanate simultaneously from a plurality of sound sources around a listener. In another embodiment virtual speech may appear to emanate from within a listener's body.

In a similar manner to AR/MR scenarios, VR scenarios can also benefit from more accurate and less intrusive spatial audio generation and delivery while minimizing psychoacoustic effects. Like AR/MR scenarios, VR scenarios must also account for one or more moving viewers/listeners units rendering of spatial audio. Accurately rendering spatial audio in terms of position, orientation and volume can improve the immersiveness of VR scenarios, or at least not detract from the VR scenarios.

Figure 2:
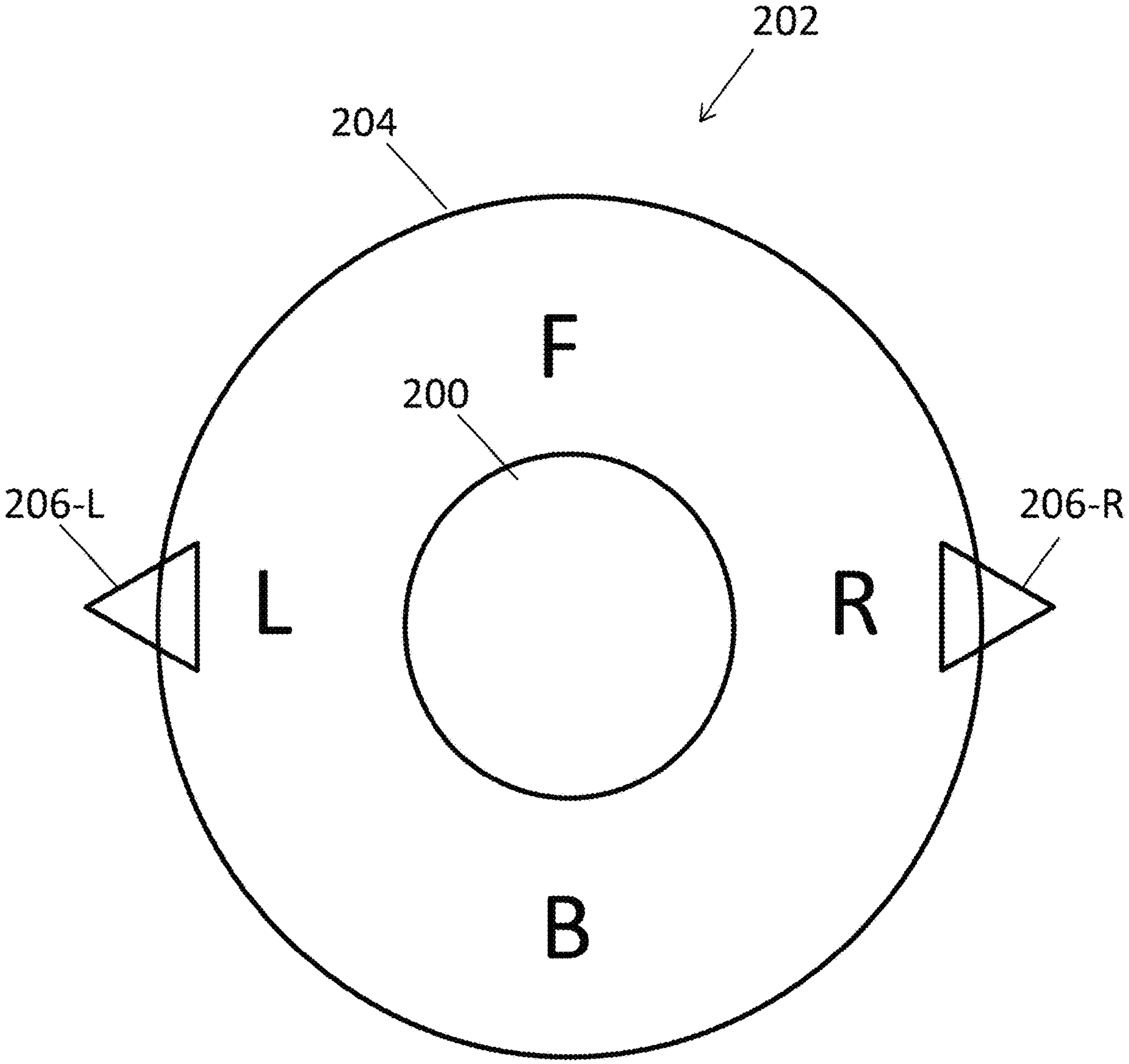
FIG. 2 is a top schematic view of a spatial audio system according to some embodiments worn on a user/listener's head.

FIG. 2 schematically depicts a spatial audio system 202 worn on a listener's head 200 in a top view from above the listener's head 200. As shown in FIG. 2, the spatial audio system 202 includes a frame 204 and two speakers 206-L, 206-R attached to the frame 204 at non-zero distances from the listener's head 200. Speaker 206-L is attached to the frame 204 such that, when the spatial audio system 202 is worn on the listener's head 200, speaker 206-L is to the left L of and at a non-zero distance from the listener's head 200. Speaker 206-R is attached to the frame 204 such that, when the spatial audio system 202 is worn on the listener's head 200, speaker 206-R is to the right R of and at a non-zero distance from the listener's head 200. Both of the speakers 206-L, 206-R are pointed toward the listener's head 200. The speaker placement depicted in FIG. 2 facilitates generation of spatial audio.

As used in this application, "speaker," includes but is not limited to, any device that generates sound, including sound outside of the typical humans hearing range. Because sound is basically movement of air molecules, many different types of speakers can be used to generate sound. One or more of the speakers 206-L, 206-R depicted in FIG. 2 can be a conventional electrodynamic speaker or a vibration transducer that vibrates a surface to generate sound. In embodiments including vibration transducers, the transducers may vibrate any surfaces to generate sound, including but not limited to, the frame 204 and the skull of the listener. The speakers 206-L, 206-R may be removably attached to the frame 204 (e.g., magnetically) such that the speakers 206-L, 206-R may be replaced and/or upgraded.

Figure 3:
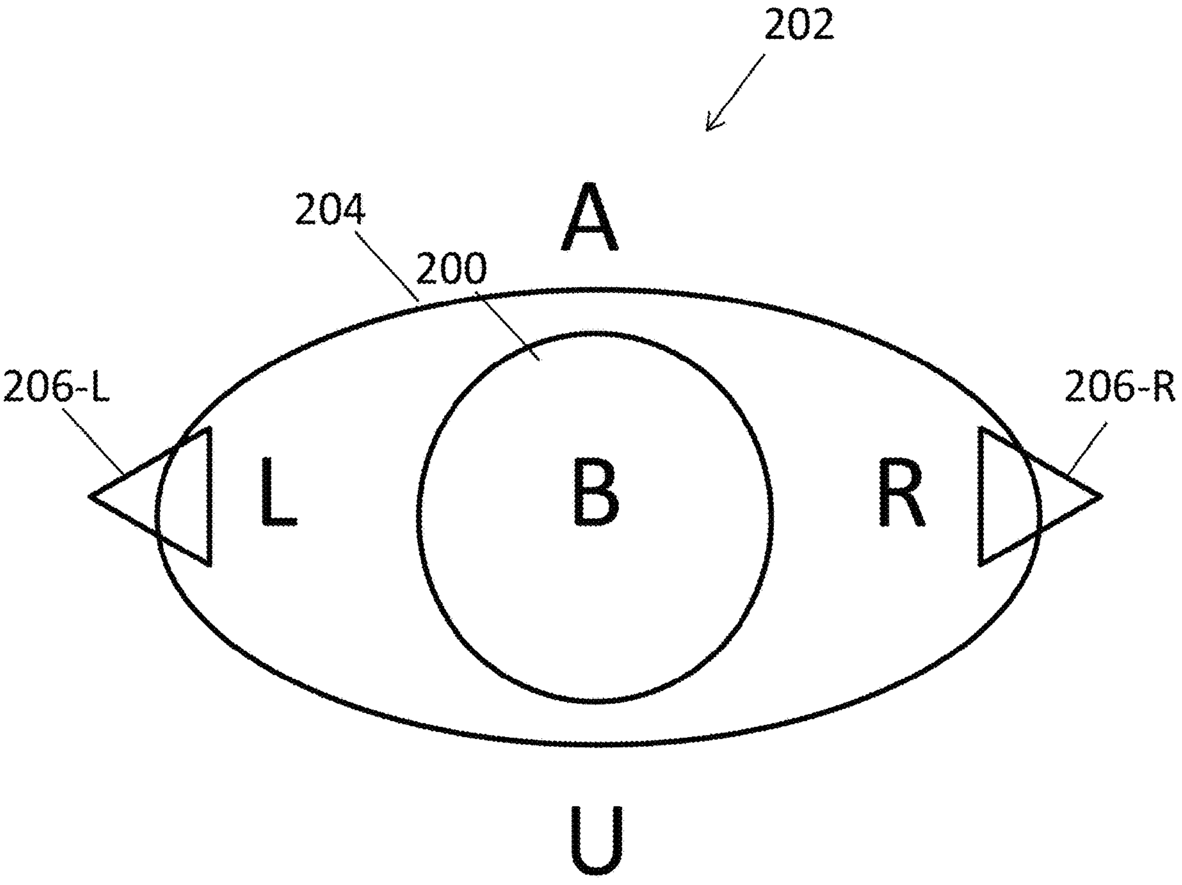
FIG. 3 is a back schematic view of the spatial audio system worn on the user/listener's head as depicted in FIG. 2.

FIG. 3 schematically depicts the spatial audio system 202 depicted in FIG. 2 from a back view behind the listener's head 200. As shown in FIG. 3, the frame 204 of the spatial audio system 202 may be configured such that when the spatial audio system 202 is worn on the listener's head 200, the front of the frame 204 is above A the listener's head 200 and the back of the frame 204 is under U listener's head 200. Because the speakers 206-L, 206-R of the spatial audio system 202 are attached to approximately the middle of the frame 204, the speakers 206-L, 206-R are disposed at about the same level as the listener's head 200, when the spatial audio system 202 is worn on the listener's head 200. The speaker placement depicted in FIG. 3 facilitates generation of spatial audio.

Figure 4:
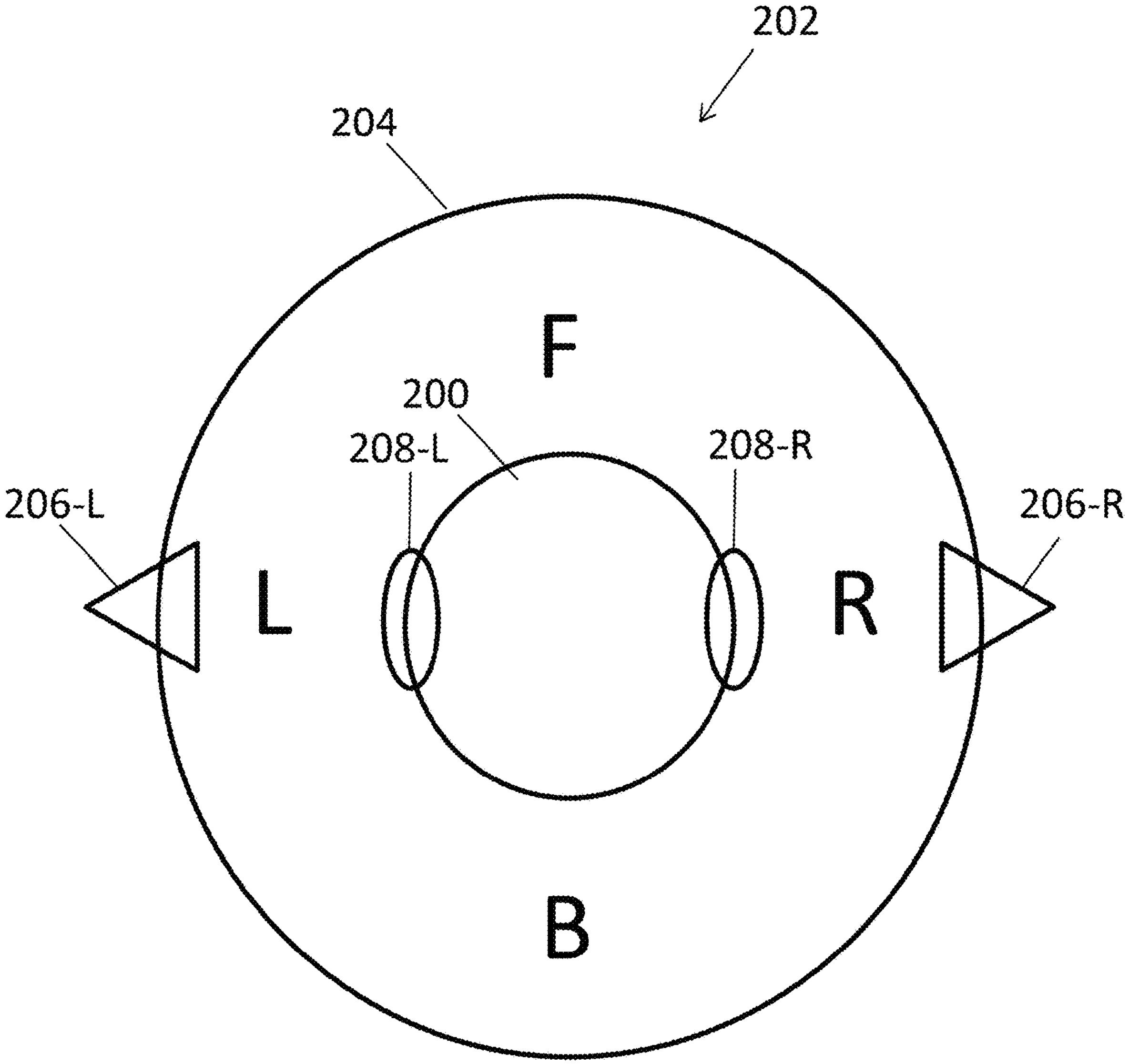
FIG. 4 is a more detailed top schematic view of the spatial audio system worn on the user/listener's head as depicted in FIG. 2.

While it has been stated that the speakers 206-L, 206-R are pointed toward and at non-zero distances from the listener's head 200, it is more accurate to describe the speakers 206-L, 206-R as being pointed toward and at non-zero distances from the listener's ears 208-L, 208-R, as shown in FIG. 4. FIG. 4 is a top view similar to the one depicted in FIG. 2. Speaker 206-L is pointed toward and at non-zero distances from the listener's left ear 208-L. Speaker 206-R is pointed toward and at non-zero distances from the listener's right ear 208-R. Pointing the speakers 206-L, 206-R toward the listener's ears 208-L, 208-R minimizes the volume needed to render the spatial audio for the listener. This, in turn, reduces the amount of sound leaking from the spatial audio system 202 (e.g., directed toward unintended listeners). Each speaker 206-L, 206-R may generate a predominately conical bloom of sound waves to focus spatial audio toward one of the listener's ears 208-L, 208-R. The frame 204 may also be configured to focus the spatial audio toward the listener's ears 208-L, 208-R. For instance, the frame 204 may include or form an acoustic waveguide to direct the spatial audio.

While the system 202 in FIGS. 2 to 4 includes two speakers 206-L, 206-R, other spatial audio systems may include more speakers. In other embodiments, a spatial audio system includes four or six speakers (and corresponding sound channels) displaced from each other in at least two planes along the Z axis (relative to the user/listener) to more accurately and precisely image sound sources that tilt relative to the user/listener's head.

Figure 5:
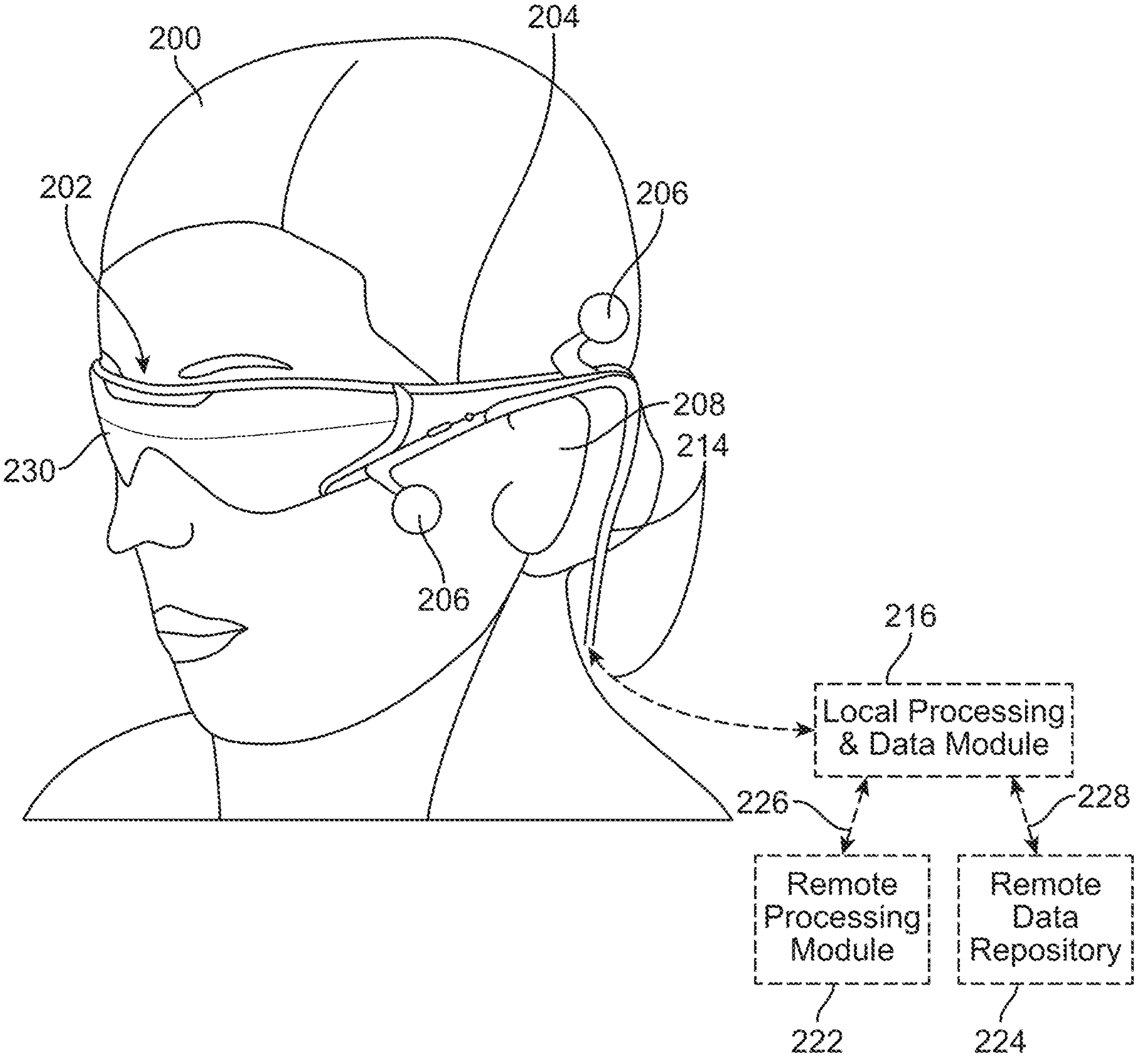
FIGS. 5 to 8 are partial perspective and partial schematic views of spatial audio systems worn on a user/listener's head according to some embodiments.

Referring now to FIGS. 5 to 8, some embodiments of spatial audio systems integrated into head-mounted displays are illustrated. As shown in FIG. 5, a head-mounted spatial audio system 202, including a frame 204 coupled to a plurality of speakers 206, is worn by a listener on a listener's head 200. The following describes possible components of an exemplary spatial audio system 202. The described components are not all necessary to implement a spatial audio system 202.

Figure 6:
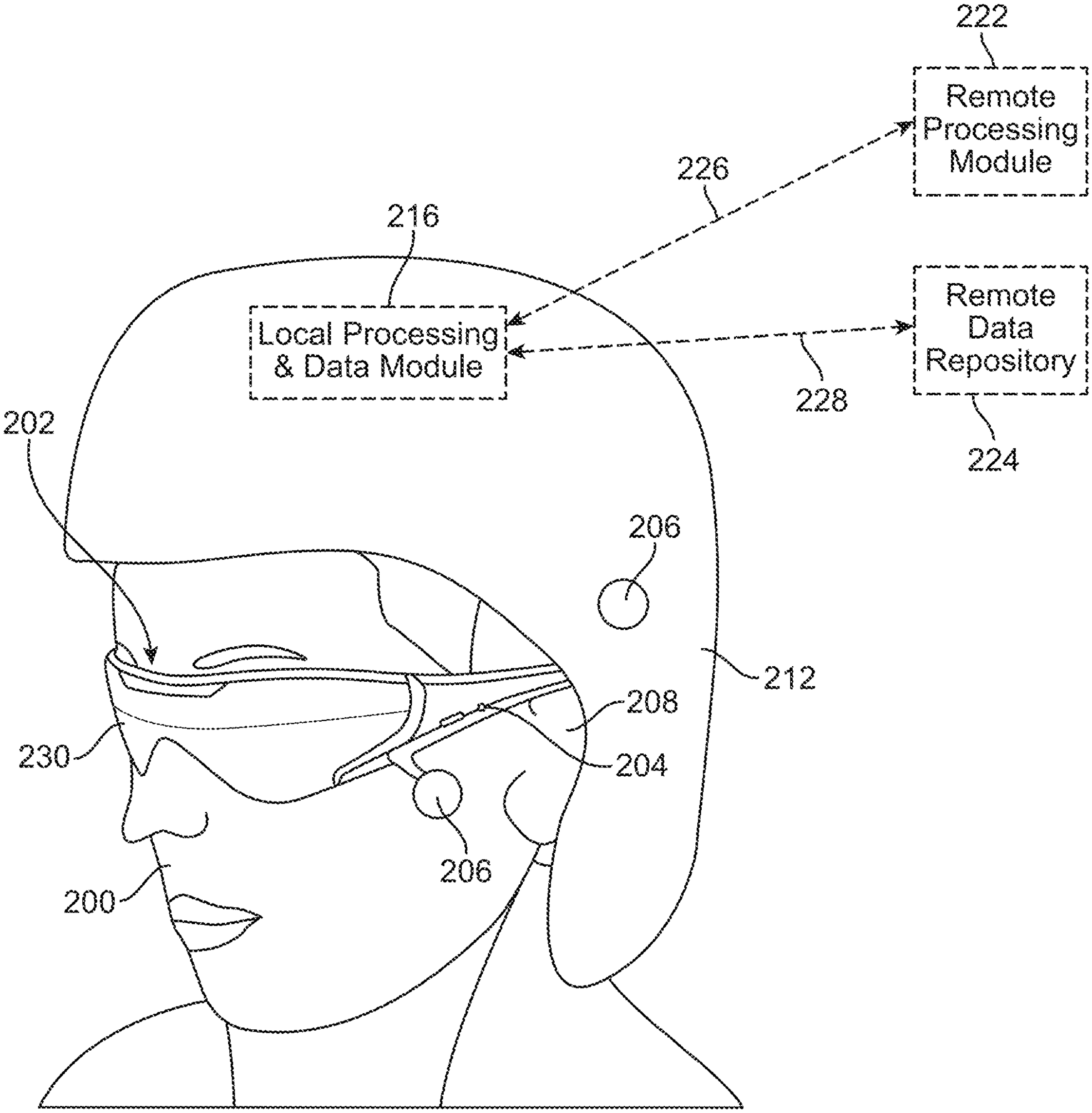
Figure 7:
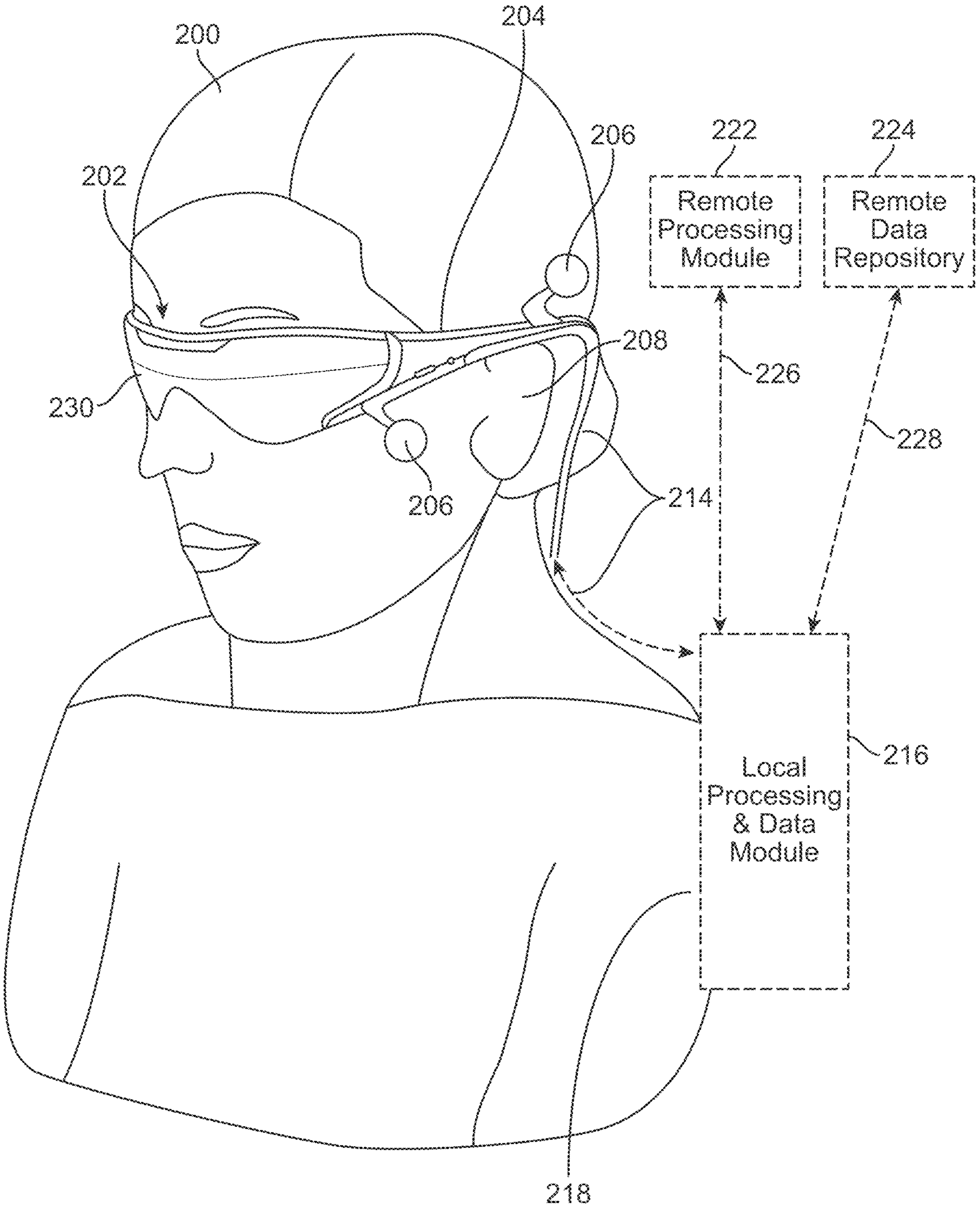
Figure 8:
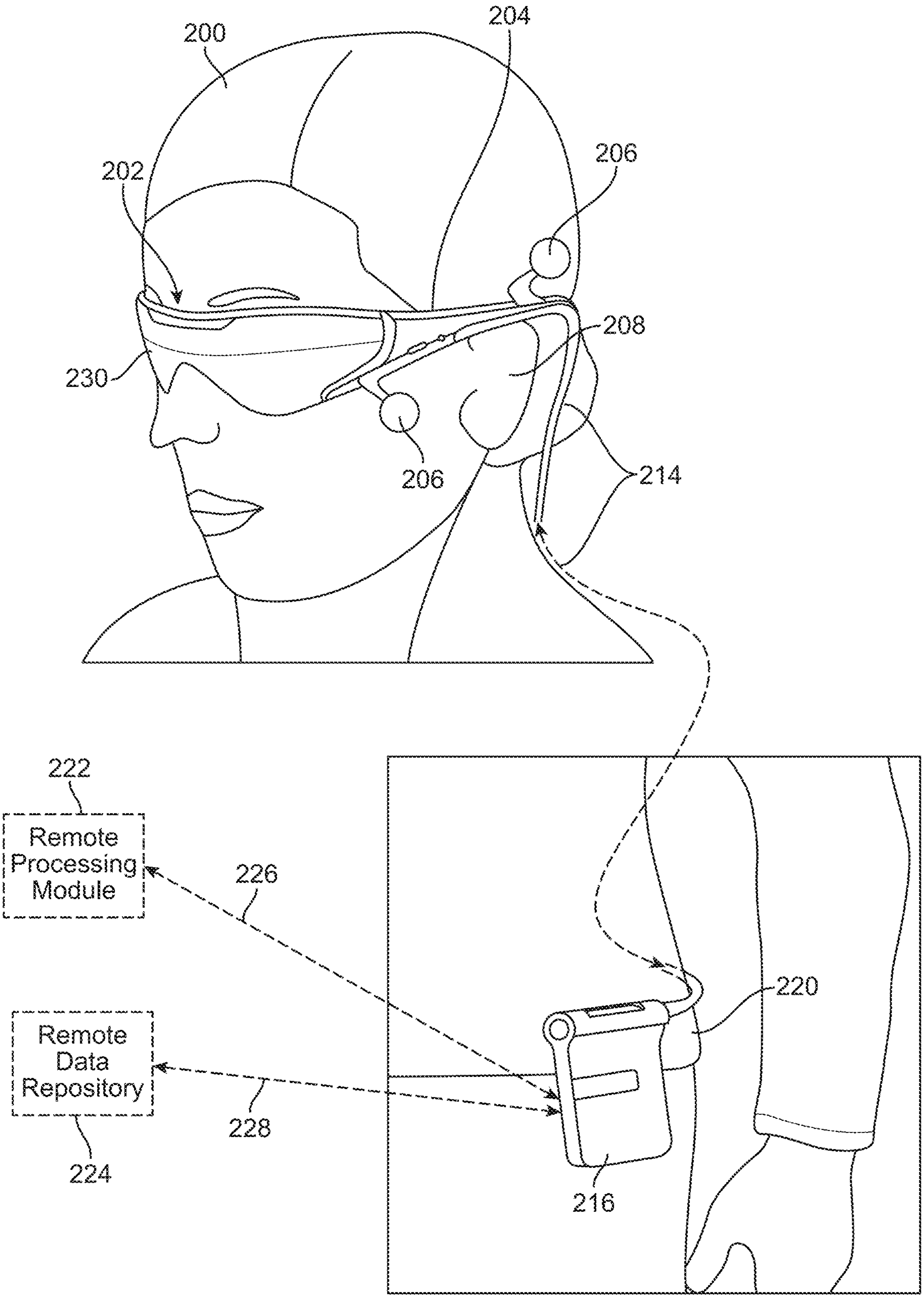

Although not shown in FIGS. 5 to 8, another pair of speakers 206 is positioned adjacent the listener's head 200 on the other side of the listener's head 200 to provide for spatial sound. As such, this spatial audio system 202 includes a total of four speakers 206. However, spatial audio systems can include two speakers like the systems depicted in FIGS. 2 to 4. Although the speakers 206 in the spatial audio systems 202 depicted in FIGS. 5, 7 and 8 are attached to respective frames 204, some or all of the speakers 206 of the spatial audio system 202 may be attached to or embedded in a helmet or hat 212 as shown in the embodiment depicted in FIG. 6.

The speakers 206 of the spatial audio system 202 are operatively coupled, such as by a wired lead and/or wireless connectivity 214, to a local processing and data module 216, which may be mounted in a variety of configurations, such as fixedly attached to the frame 204, fixedly attached to/embedded in a helmet or hat 212 as shown in the embodiment depicted in FIG. 6, removably attached to the torso 218 of the listener in a backpack-style configuration as shown in the embodiment of FIG. 7, or removably attached to the hip 220 of the listener in a belt-coupling style configuration as shown in the embodiment of FIG. 8.

The local processing and data module 216 may comprise one or more power-efficient processors or controllers, as well as digital memory, such as flash memory, both of which may be utilized to assist in the processing, caching, and storage of data. The data may be captured from sensors which may be operatively coupled to the frame 204, such as image capture devices (such as visible and infrared light cameras), inertial measurement units ("IMU", which may include accelerometers and/or gyroscopes), compasses, microphones, GPS units, and/or radio devices. Alternatively or additionally, the data may be acquired and/or processed using a remote processing module 222 and/or remote data repository 224, possibly to facilitate/direct generation of sound by the speakers 206 after such processing or retrieval. The local processing and data module 216 may be operatively coupled, such as via a wired or wireless communication links 226, 228, to the remote processing module 222 and the remote data repository 224 such that these remote modules 222, 224 are operatively coupled to each other and available as resources to the local processing and data module 216.

In one embodiment, the remote processing module 222 may comprise one or more relatively powerful processors or controllers configured to analyze and process audio data and/or information. In one embodiment, the remote data repository 224 may comprise a relatively large-scale digital data storage facility, which may be available through the Internet or other networking configuration in a "cloud" resource configuration. However, to minimize system lag and latency, virtual sound rendering (especially based on detected pose information) may be limited to the local processing and data module 216. In one embodiment, all data is stored and all computation is performed in the local processing and data module 216, allowing fully autonomous use from any remote modules.

In one or more embodiments, the spatial audio system is typically fitted for a particular listener's head, and the speakers are aligned to the listener's ears. These configuration steps may be used in order to ensure that the listener is provided with an optimum spatial audio experience without causing any physiological side-effects, such as headaches, nausea, discomfort, etc. Thus, in one or more embodiments, the listener-worn spatial audio system is configured (both physically and digitally) for each individual listener, and a set of programs may be calibrated specifically for the listener. For example, in some embodiments, the listener worn spatial audio system may detect or be provided with respective distances between speakers of the head worn spatial audio system and the listener's ears, and a 3-D mapping of the listener's head. All of these measurements may be used to provide a head-worn spatial audio system customized to fit a given listener.

Although not needed to implement a spatial audio system, a display 230 may be coupled to the frame 204 (e.g., for an optical XR experience in addition to the spatial audio experience), as shown in FIGS. 5 to 8. In embodiments including a display 230, the local processing and data module 216, the remote processing module 222 and the remote data repository 224 may process 3-D video data in addition to spatial audio data.

Figure 9:
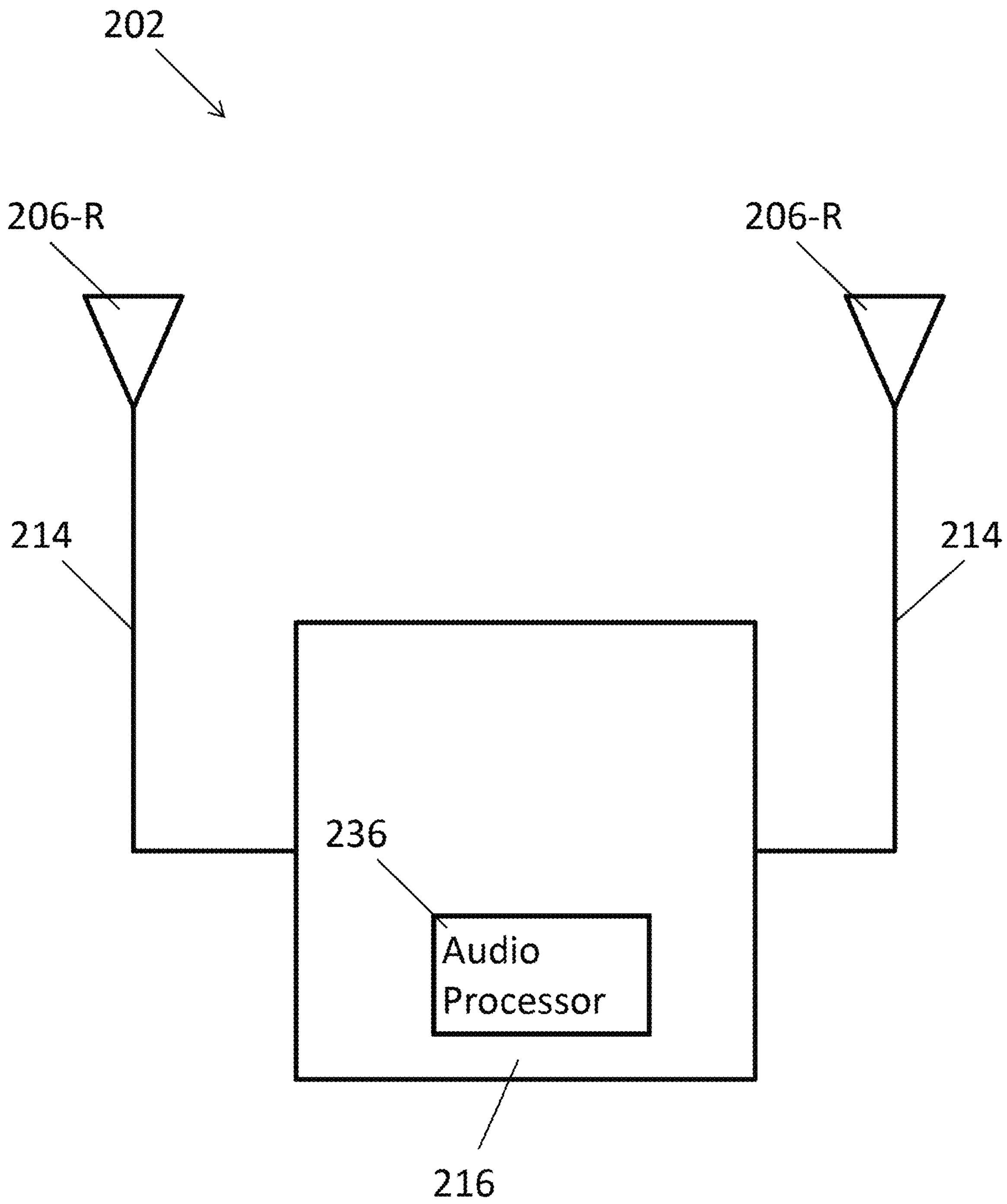
FIG. 9 is a detailed schematic view of a spatial audio system according to some embodiments.

FIG. 9 depicts a head-mounted spatial audio system 202, according to one embodiment, including a plurality of spatial audio system speakers 206-L, 206-R operatively coupled to a local processing and data module 216 via wired lead and/or wireless connectivity 214. While the spatial audio system 202 depicted in FIG. 9 includes only two spatial audio system speakers 206-L, 206-R, spatial audio systems according to other embodiments may include more speakers.

The spatial audio system 202 also includes a spatial audio processor 236 to generate spatial audio data for spatial audio to be delivered to a listener/user wearing the spatial audio system 202. The generated spatial audio data may include content, position, orientation and volume data for each virtual audio source in a spatial sound field. As used in this application, "audio processor," includes, but is not limited to, one or more separate and independent software and/or hardware components of a computer that must be added to a general purpose computer before the computer can generate spatial audio data, and computers having such components added thereto. The spatial audio processor 234 may also generate audio signals for the plurality of spatial audio system speakers 206-L, 206-R based on the spatial audio data to deliver spatial audio to the listener/user.

Figure 10:
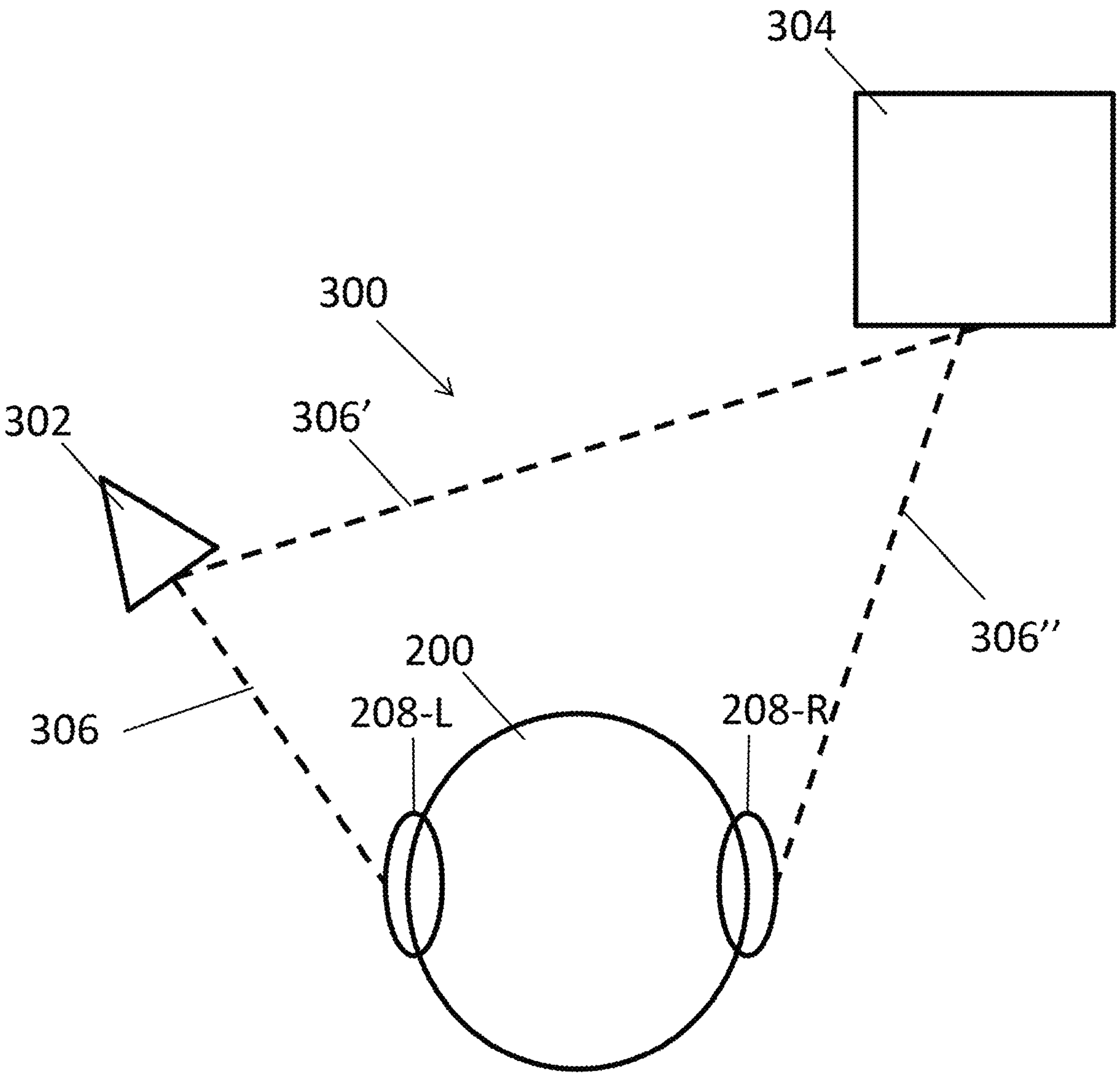
FIG. 10 is a schematic view of a spatialized sound field generated by a real physical audio source.

FIG. 10 depicts a spatial sound field 300 as generated by a real physical audio source 302. The real physical sound source 302 has a location and an orientation. The real physical sound source 302 generates a sound wave having many portions. Due to the location and orientation of the real physical sound source 302 relative to the listener's head 200, a first portion 306 of the sound wave is directed to the listener's left ear 208-L. A second portion 306' of the sound wave is directed away from the listener's head 200 and toward an object 304 in the spatial sound field 300. The second portion 306' of the sound wave reflects off of the object 304 generating a reflected third portion 306", which is directed to the listener's right ear 208-R. Because of the different distances traveled by the first portion 306 and second and third portions 306', 306" of the sound wave, these portions will arrive at slightly different times to the listener's left and right ears 208-L, 208-R. Further, the object 304 may modulate the sound of the reflected third portion 306" of the sound wave before it reaches the listener's right ear 208-R.

The spatial sound field 300 depicted in FIG. 10 is a fairly simple one including only one real physical sound source 302 and one object 304. A spatial audio system 202 reproducing even this simple spatial sound field 300 must account for various reflections and modulations of sound waves. Spatial sound fields with more than one sound source and/or more than on object interacting with the sound wave(s) therein are exponentially more complicated. Spatial audio systems 202 must be increasingly powerful to reproduce these increasingly complicated spatial sound fields. While the spatial audio processor 236 depicted in FIG. 9 is a part of the local processing and data module 216, more powerful spatial audio processor 236 in other embodiments may be a part of the remote processing module 222 in order to conserve space and power at the local processing and data module 216.

Spatial Audio Generation and Filtering

Figure 11:
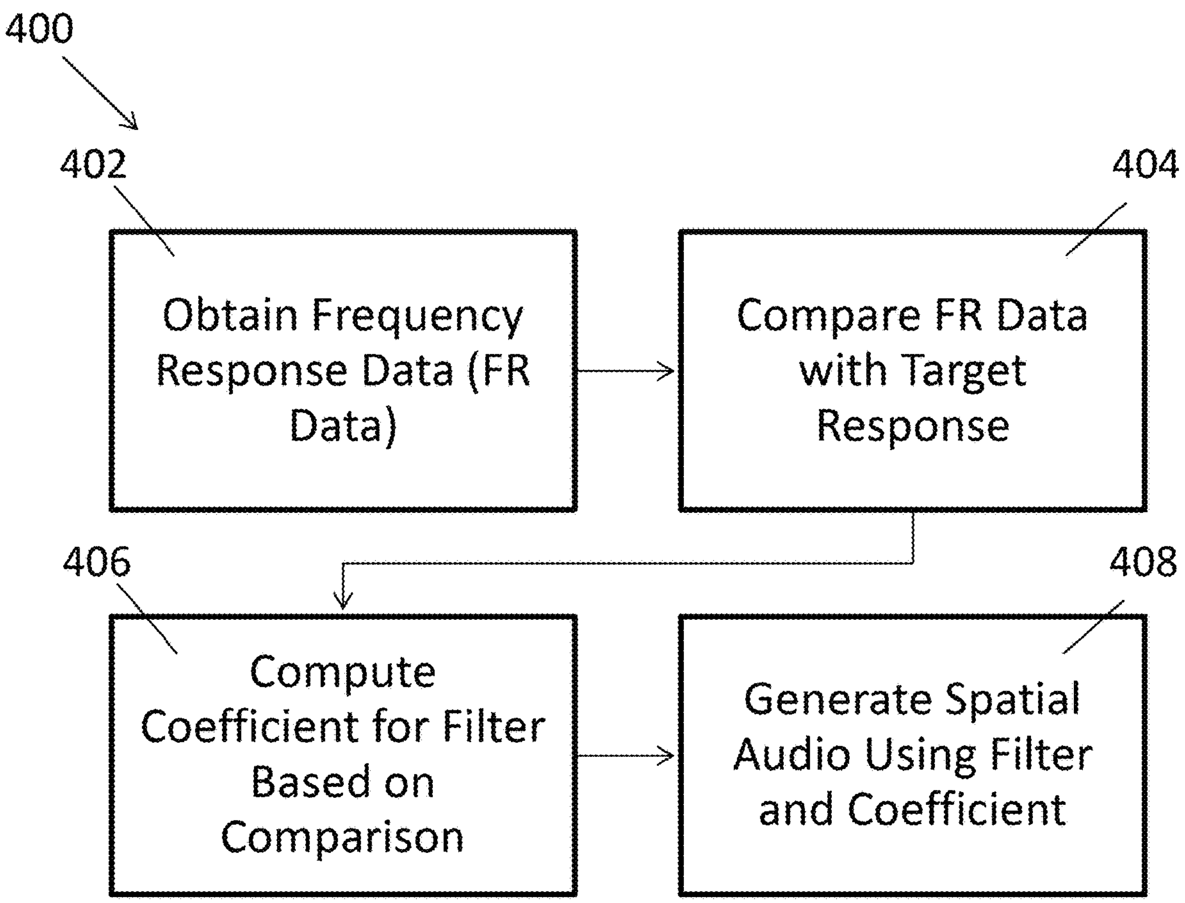
FIGS. 11 to 22 are flowcharts depicting methods for generating spatial audio for use with speakers coupled to head-mounted display systems at non-zero distances from users' ears using spatial audio systems according to some embodiments.

FIG. 11 depicts a method 400 for generating spatial audio for use with speakers coupled to head-mounted display systems at non-zero distances from users' ears according to some embodiments. The method 400 reduces inaccuracies in the generated spatial audio resulting from characteristics of the speakers.

At step 402, the spatial audio system obtains frequency response data of a speaker. In some embodiments, the frequency response data is measured (e.g., by delivering a known sound through the speaker). In some embodiments, the frequency response data is simulated (e.g., using known characteristics of the speaker).

At step 404, the spatial audio system compares the obtained frequency response data with target frequency response data. Comparing the obtained frequency response data with the target frequency response data may include processing the obtained frequency response data with the target frequency response data with a peak and notch detector.

At step 406, the spatial audio system computes a coefficient for a filter based on the results of the comparison at step 404. The filter may be a parallel infinite impulse response (IIR) and finite impulse response (FIR) combination filter system.

At step 408, the spatial audio system generates spatial audio data using the filter and the computed coefficient. The spatial audio data generated using the filter and the computed coefficient reduces inaccuracies in the generated spatial audio resulting from characteristics of the speaker.

Figure 12:
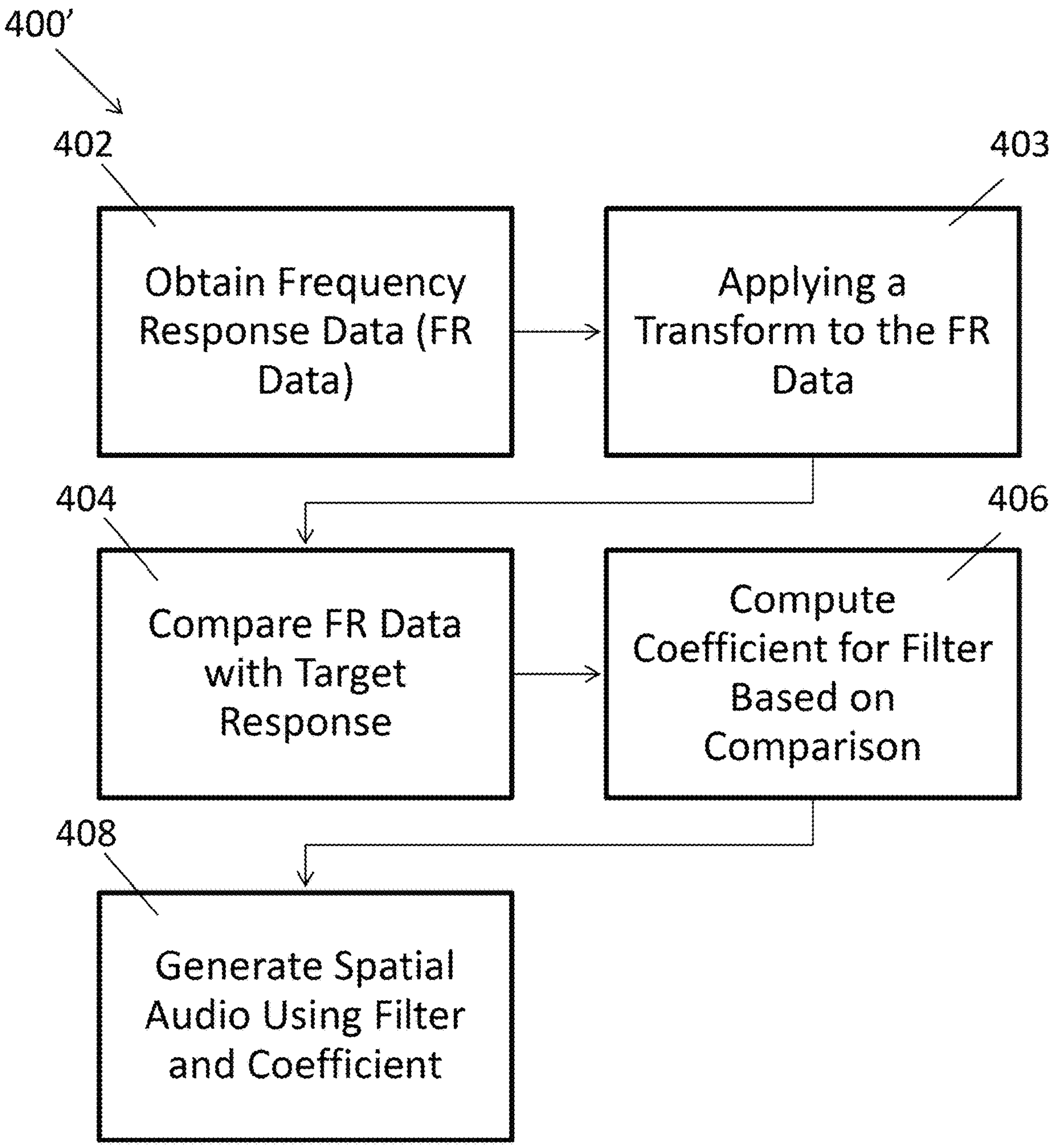

FIG. 12 depicts a method 400' for generating spatial audio for use with speakers coupled to head-mounted display systems at non-zero distances from users' ears according to some embodiments. The method 400' is similar to the method 400 depicted in FIG. 11 and reduces inaccuracies in the generated spatial audio resulting from characteristics of the speakers. The difference between the methods 400, 400' is that in the method 400' depicted in FIG. 12, a transform is applied to the frequency response data at step 403 before the frequency response data is compared with target frequency response data at step 404. The transform applied at step 403 may be a frequency transform and/or a smoothing transform.

Figure 13:
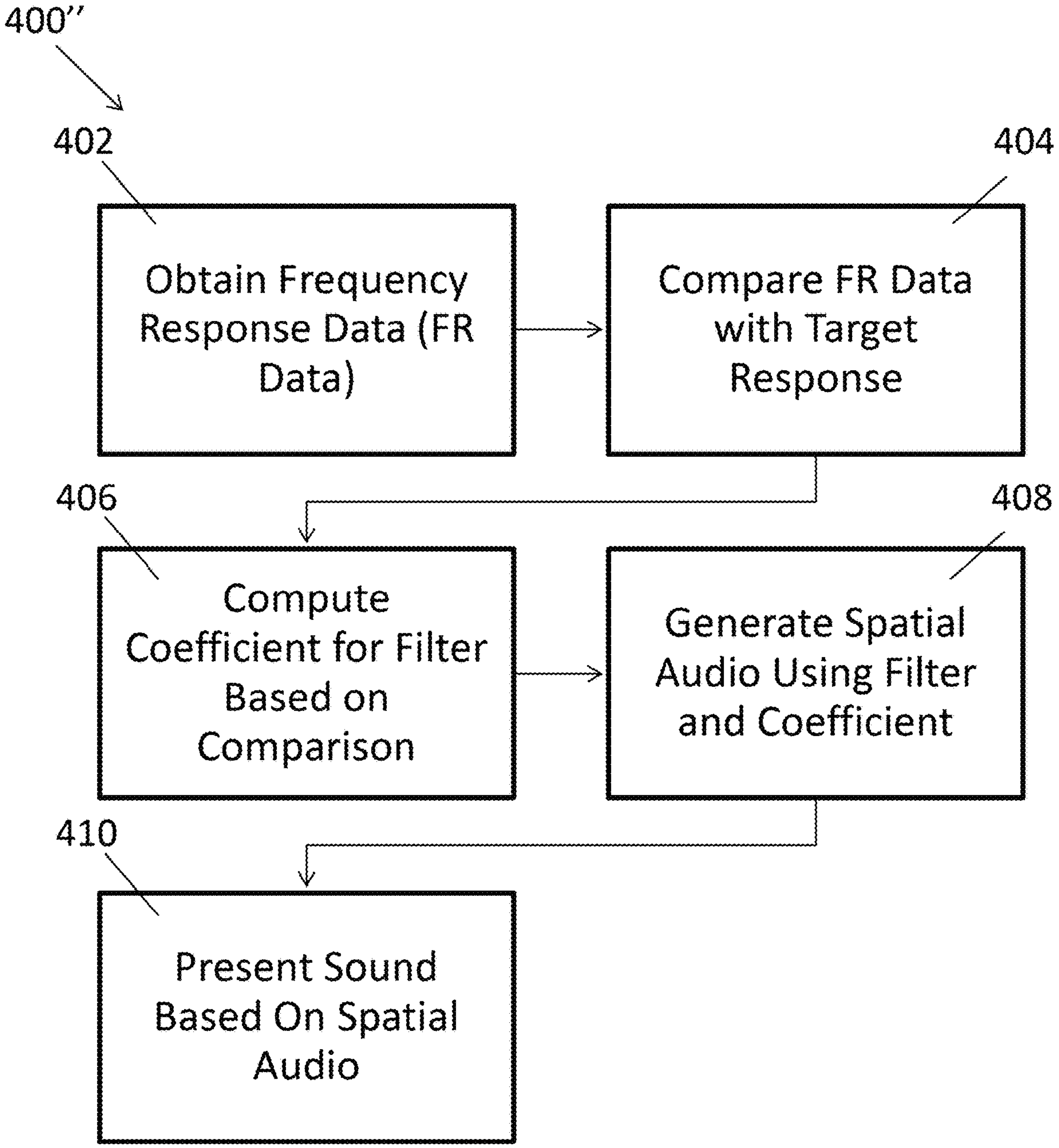

FIG. 13 depicts a method 400" for generating spatial audio for use with speakers coupled to head-mounted display systems at non-zero distances from users' ears according to some embodiments. The method 400" is similar to the method 400 depicted in FIG. 11 and reduces inaccuracies in the generated spatial audio resulting from characteristics of the speakers. The difference between the methods 400, 400" is that in the method 400" depicted in FIG. 13 at step 410, the spatial audio system presents sound to the user based on the spatial audio data generated at step 408. The presented sound may be part of a spatial audio field and is presented with speakers coupled to display devices at non-zero distances from a user's ears.

Figure 14:
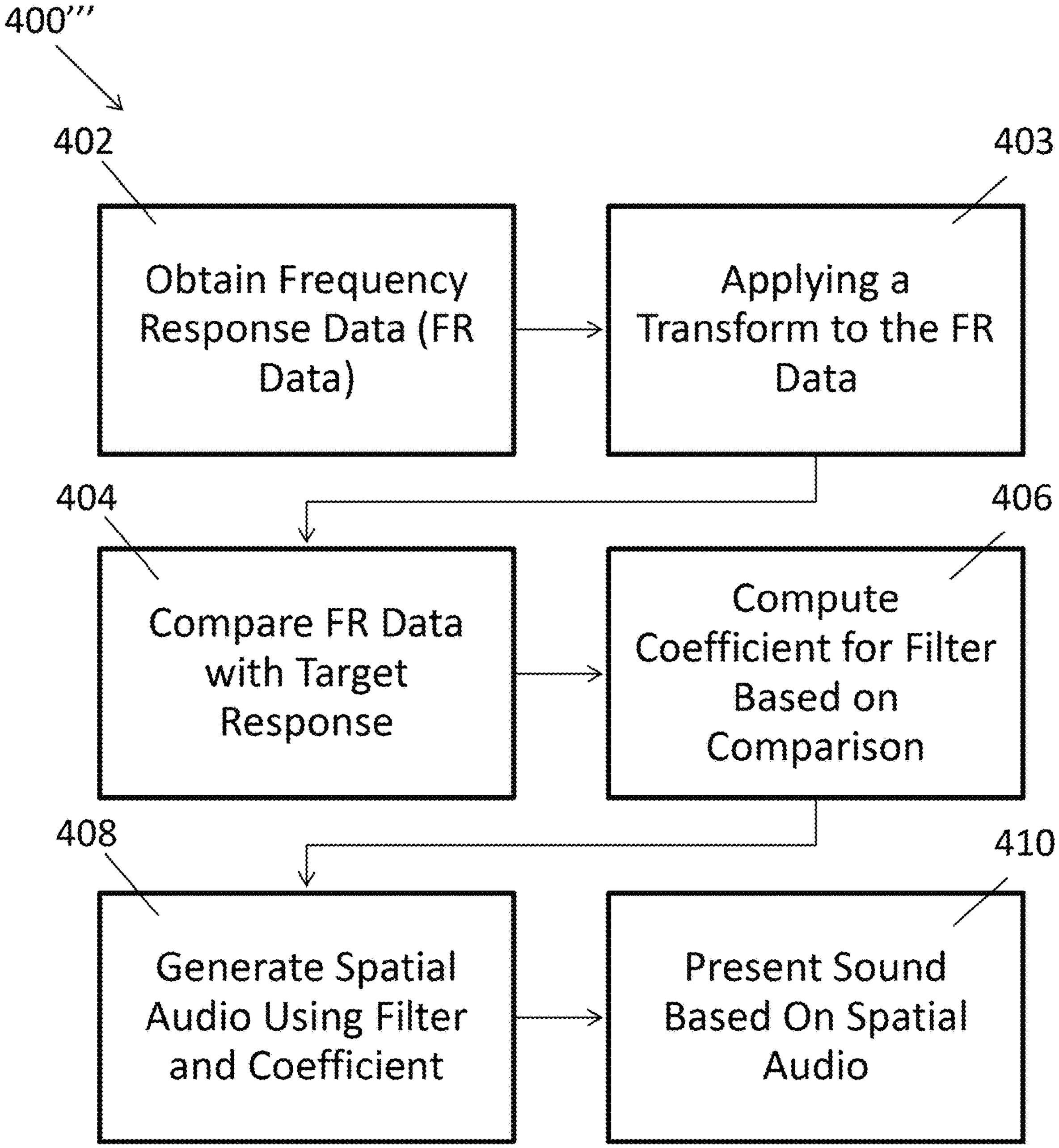

FIG. 14 depicts a method 400''' for generating spatial audio for use with speakers coupled to head-mounted display systems at non-zero distances from users' ears according to some embodiments. The method 400''' is similar to the method 400 depicted in FIG. 11 and reduces inaccuracies in the generated spatial audio resulting from characteristics of the speakers. The difference between the methods 400, 400''' is that in the method 400''' depicted in FIG. 14, a transform is applied to the frequency response data at step 403 before the frequency response data is compared with target frequency response data at step 404. The transform applied at step 403 may be a frequency transform and/or a smoothing transform. Also, at step 410, the spatial audio system presents sound to the user based on the spatial audio data generated at step 408. The presented sound may be part of a spatial audio field and is presented with speakers coupled to display devices at non-zero distances from a user's ears.

Figure 15:
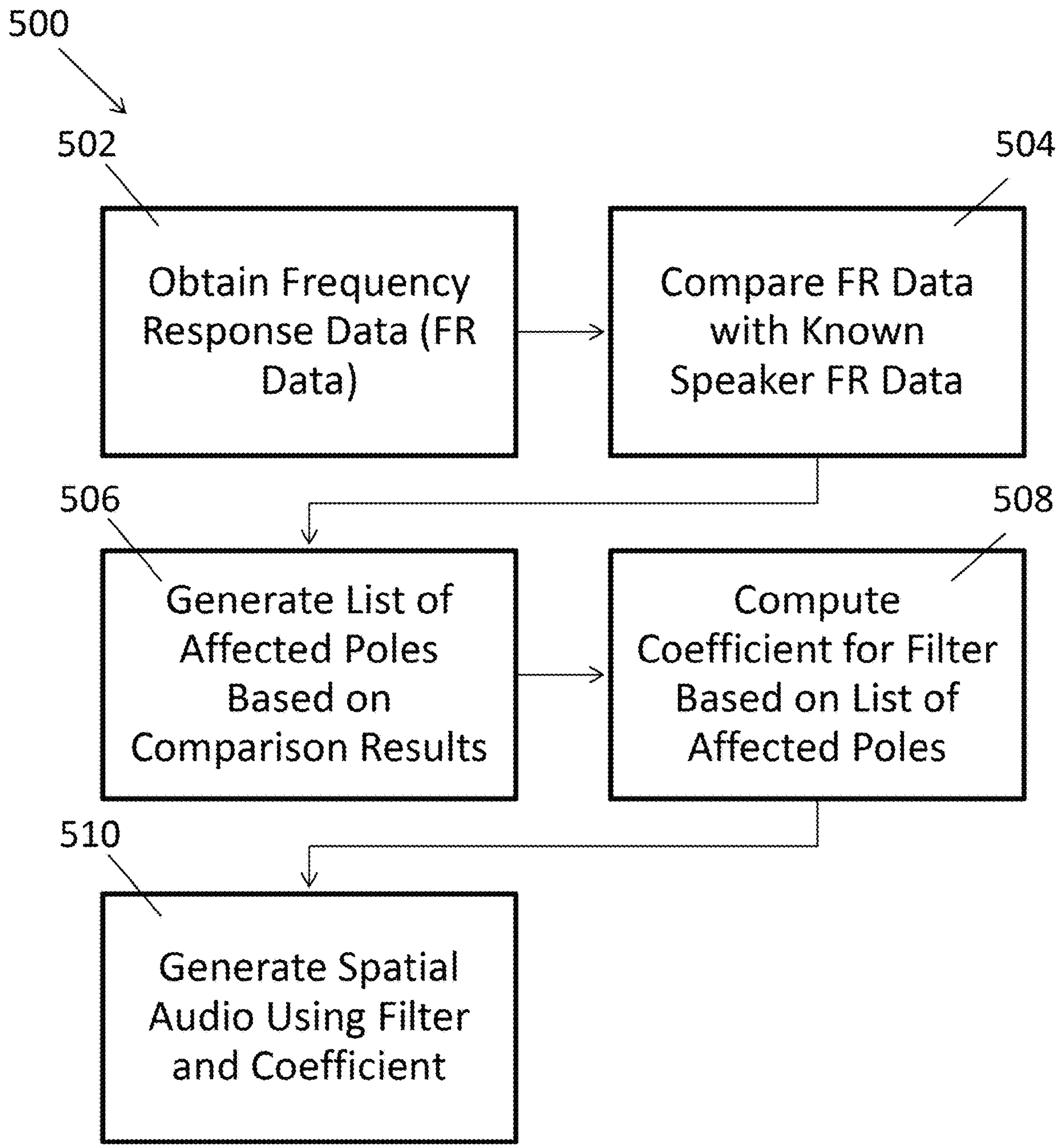

FIG. 15 depicts a method 500 for generating spatial audio for use with speakers coupled to head-mounted display systems at non-zero distances from users' ears according to some embodiments. The method 500 reduces inaccuracies in the generated spatial audio resulting from an anthropometric effect. The anthropometric effect may be sound reflection by a user's head and ear pinna (i.e., the outside part of the ear).

At step 502, the spatial audio system obtains frequency response data of a speaker. In some embodiments, the frequency response data is measured (e.g., by delivering a known sound through the speaker). In some embodiments, the frequency response data is simulated (e.g., using known characteristics of the speaker).

At step 504, the spatial audio system compares the obtained frequency response data with known speaker frequency response data. Comparing the obtained frequency response data with the known speaker frequency response data may include processing the obtained frequency response data with the known speaker frequency response data with a peak and notch detector.

At step 506, the spatial audio system generates a list of affected frequency poles based on the results of the comparison at step 504. The list of affected frequency poles may include a list of frequency poles and respective anthropometric effects for each of the frequency poles in the list of frequency poles. Each of the anthropometric effects may include attenuation or amplification, and a magnitude of the attenuation or amplification.

At step 508, the spatial audio system computes a coefficient for a filter based on the list of affected frequency poles generated at step 506. The filter may be an effect reduction filter that uses the list of frequency poles and respective anthropometric effects to compute coefficients for a parallel infinite impulse response (IIR) and finite impulse response (FIR) combination filter system.

At step 510, the spatial audio system generates spatial audio data using the filter and the computed coefficient. The spatial audio data generated using the filter and the computed coefficient reduces inaccuracies in the generated spatial audio resulting from an anthropometric effect.

Figure 16:
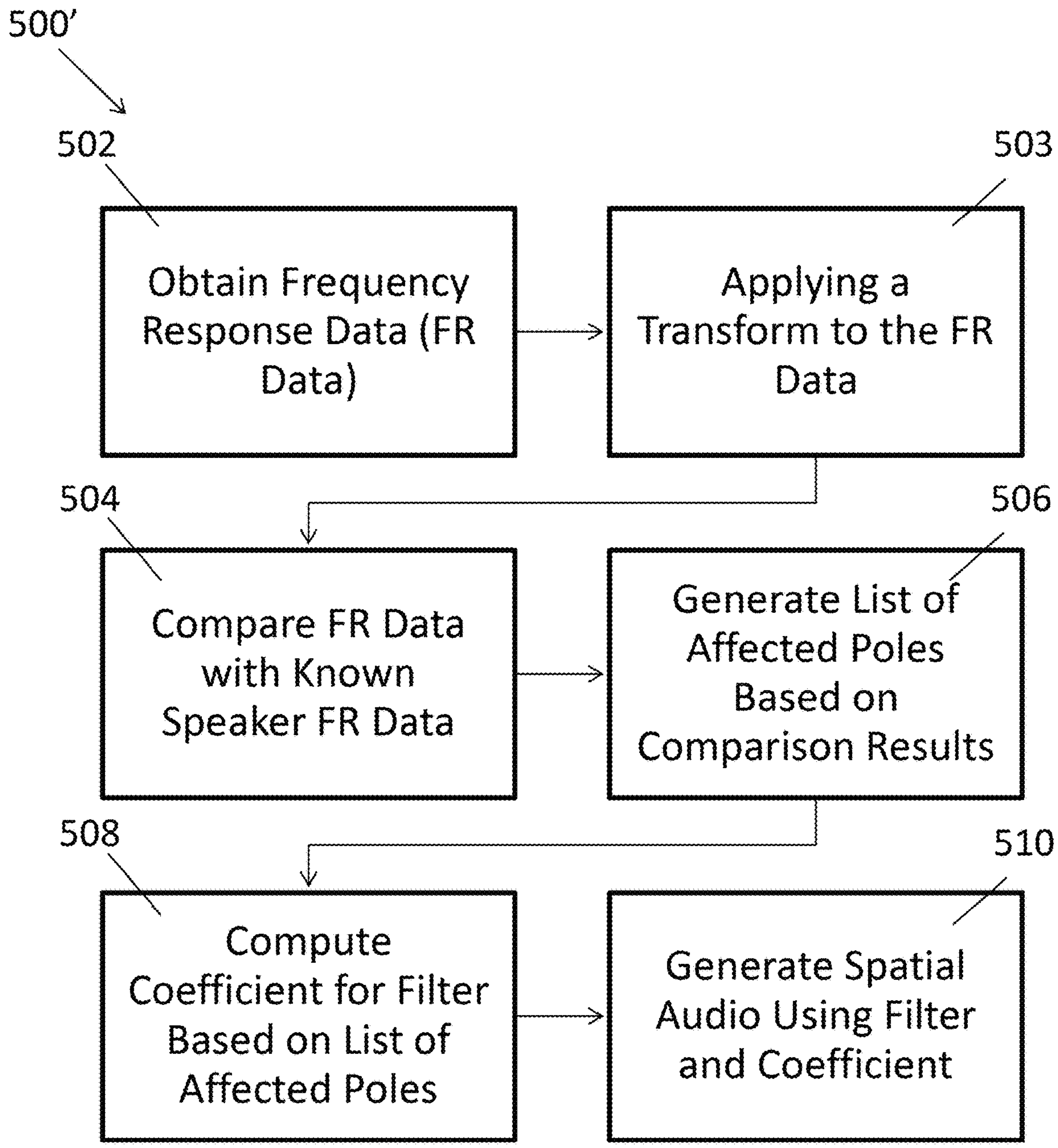

FIG. 16 depicts a method 500' for generating spatial audio for use with speakers coupled to head-mounted display systems at non-zero distances from users' ears according to some embodiments. The method 500' is similar to the method 500 depicted in FIG. 15 and reduces inaccuracies in the generated spatial audio resulting from an anthropometric effect. The difference between the methods 500, 500' is that in the method 500' depicted in FIG. 16, a transform is applied to the frequency response data at step 503 before the frequency response data is compared with known speaker frequency response data at step 504. The transform applied at step 503 may be a frequency transform and/or a smoothing transform.

Figure 17:
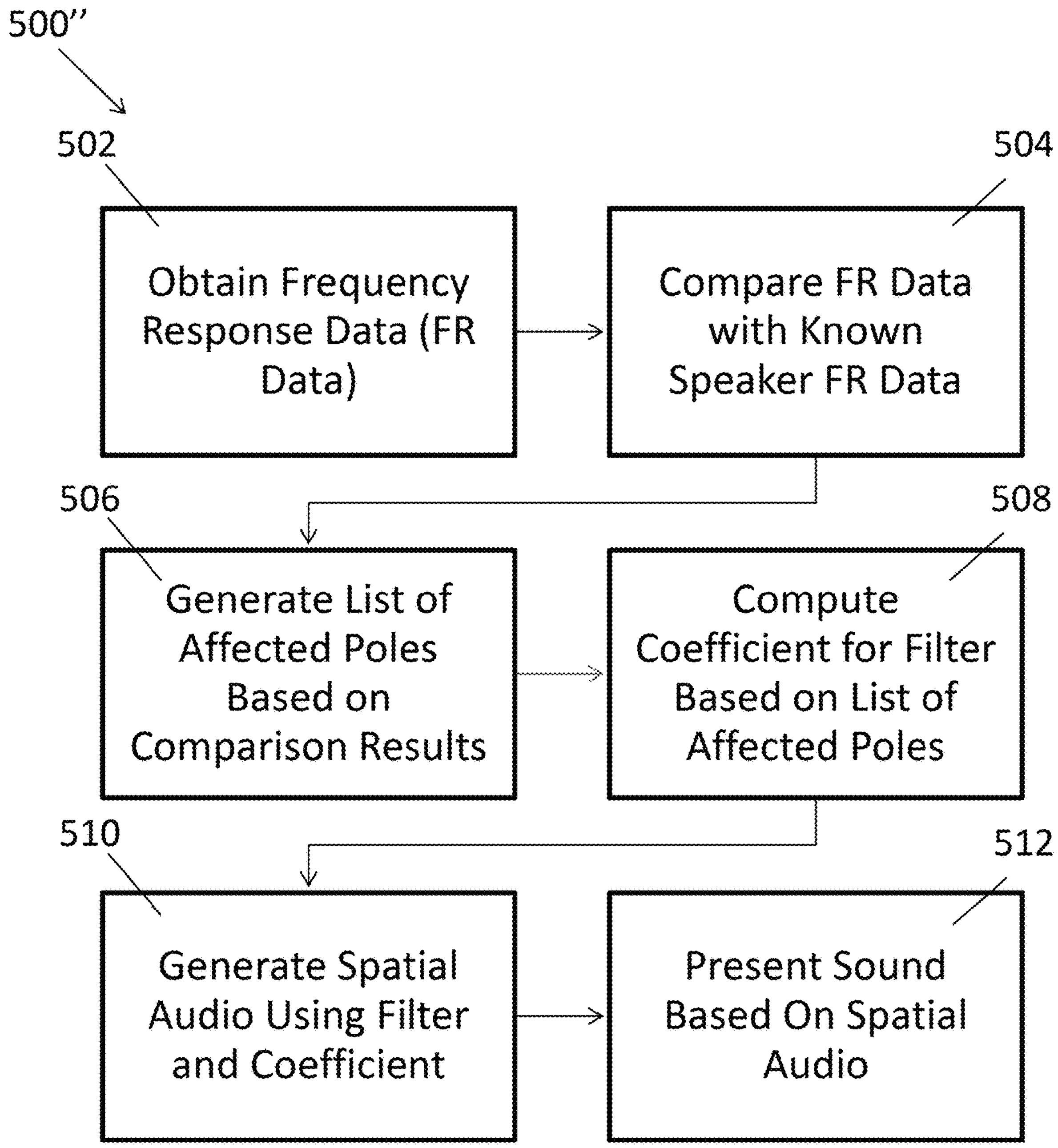

FIG. 17 depicts a method 500" for generating spatial audio for use with speakers coupled to head-mounted display systems at non-zero distances from users' ears according to some embodiments. The method 500" is similar to the method 500 depicted in FIG. 15 and reduces inaccuracies in the generated spatial audio resulting from an anthropometric effect. The difference between the methods 500, 500'' is that in the method 500'' depicted in FIG. 17 at step 512, the spatial audio system presents sound to the user based on the spatial audio data generated at step 510. The presented sound may be part of a spatial audio field and is presented with speakers coupled to display devices at non-zero distances from a user's ears.

Figure 18:
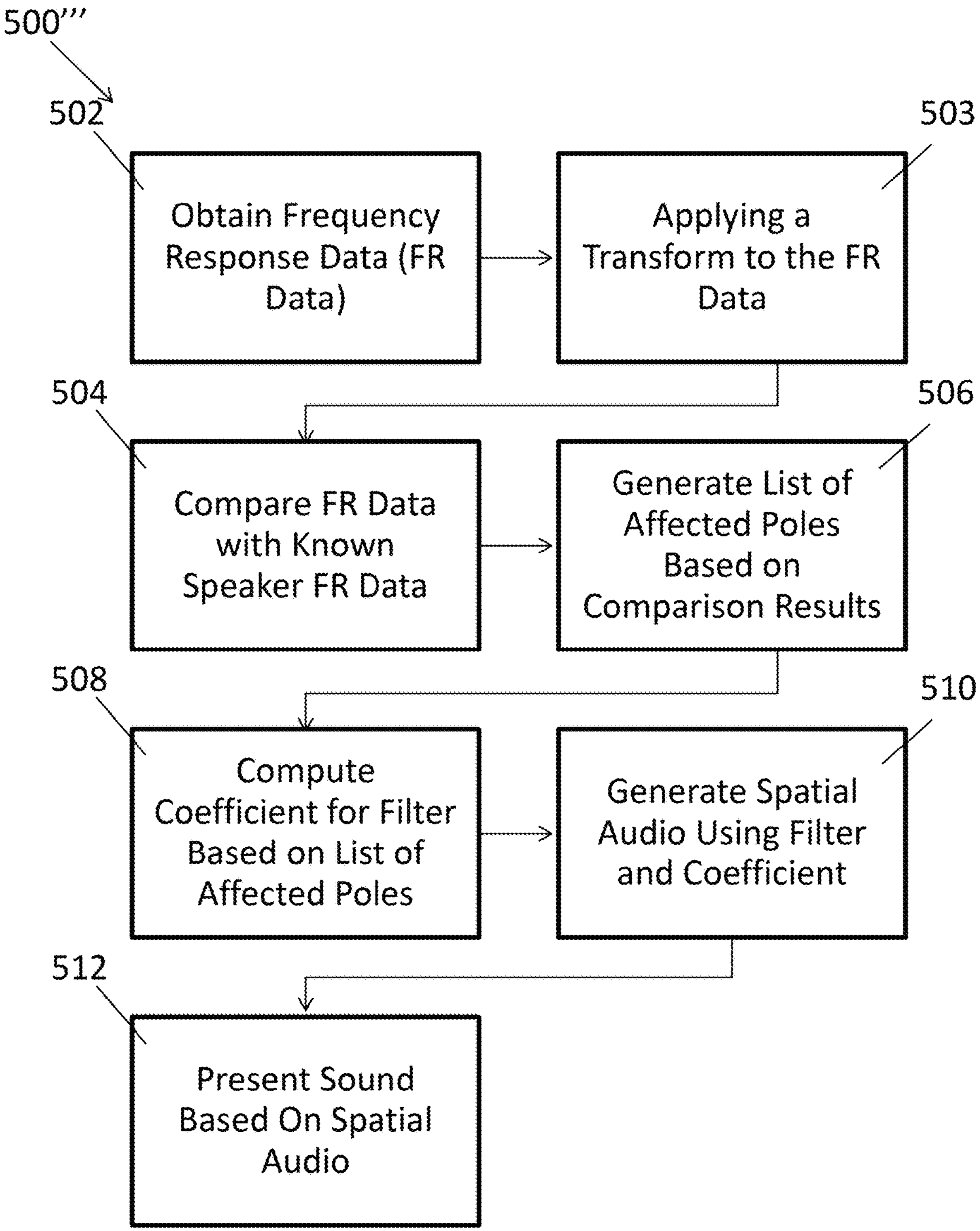

FIG. 18 depicts a method 500''' for generating spatial audio for use with speakers coupled to head-mounted display systems at non-zero distances from users' ears according to some embodiments. The method 500''' is similar to the method 500 depicted in FIG. 15 and reduces inaccuracies in the generated spatial audio resulting from an anthropometric effect. The difference between the methods 500, 500''' is that in the method 500''' depicted in FIG. 18, a transform is applied to the frequency response data at step 503 before the frequency response data is compared with known speaker frequency response data at step 504. The transform applied at step 503 may be a frequency transform and/or a smoothing transform. Also, at step 512, the spatial audio system presents sound to the user based on the spatial audio data generated at step 510. The presented sound may be part of a spatial audio field and is presented with speakers coupled to display devices at non-zero distances from a user's ears.

Figure 19:
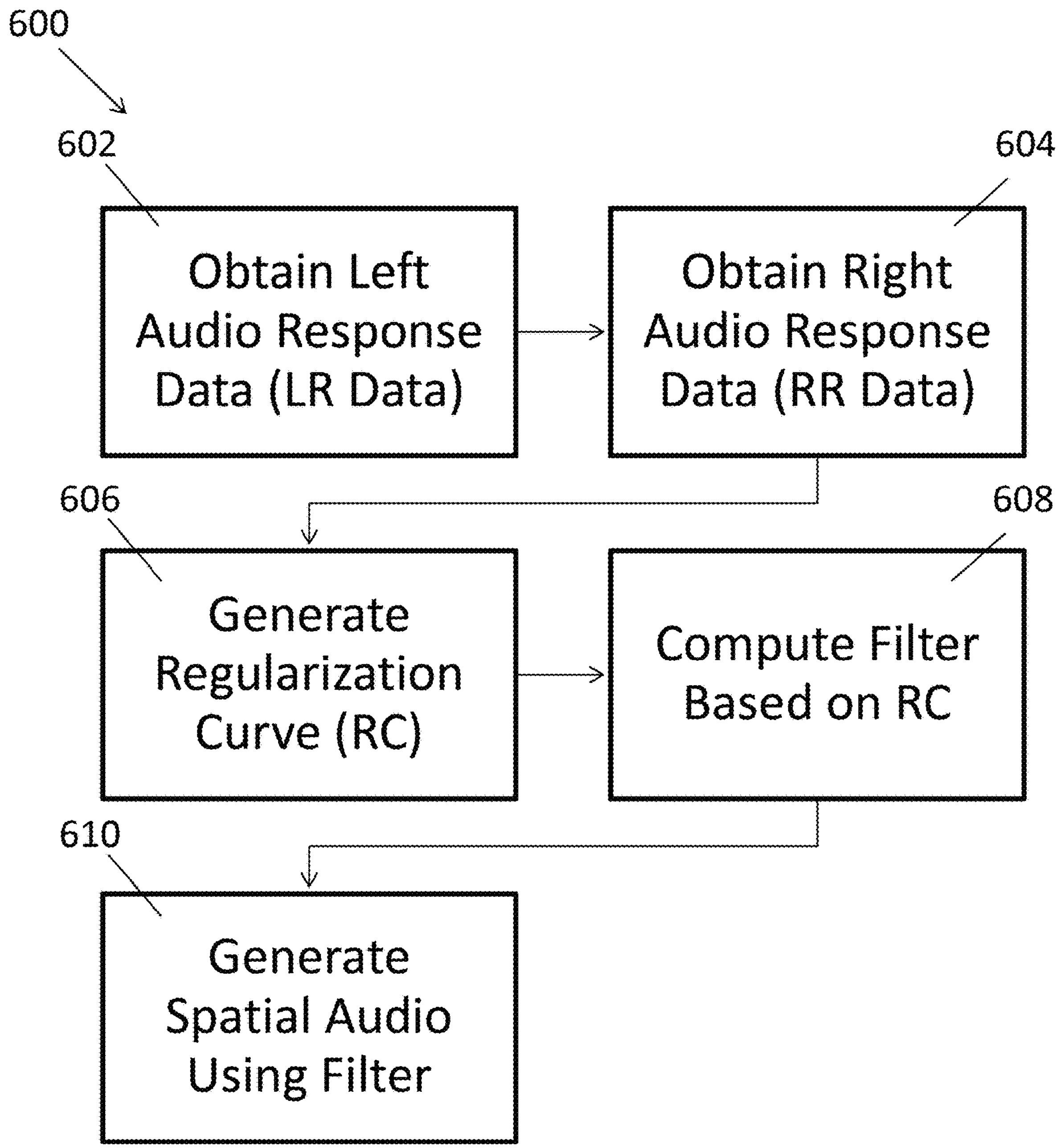

FIG. 19 depicts a method 600 for generating spatial audio for use with speakers coupled to head-mounted display systems at non-zero distances from users' ears according to some embodiments. The method 600 reduces inaccuracies in the generated spatial audio resulting from anthropometric crosstalk. The anthropometric crosstalk may be crosstalk between the left speaker and the right ear of the user and/or between the right speaker and the left ear of the user. Crosstalk includes unintended sound delivered to the opposite ear relative to the speaker.

At step 602, the spatial audio system obtains left audio response data of a left speaker. In some embodiments, the left audio response data is measured (e.g., by delivering a known sound through the left speaker). In some embodiments, the left audio response data is simulated (e.g., using known characteristics of the left speaker). The left audio response data includes a response of the left speaker to the left ear and a response of the left speaker to the right ear. The audio response data may include frequency and/or impulse response data.

At step 604, the spatial audio system obtains right audio response data of a right speaker. In some embodiments, the right audio response data is measured (e.g., by delivering a known sound through the right speaker). In some embodiments, the right audio response data is simulated (e.g., using known characteristics of the right speaker). The right audio response data includes a response of the right speaker to the right ear and a response of the right speaker to the left ear. The audio response data may include frequency and/or impulse response data.

At step 606, the spatial audio system generates a regularization curve based on the left and right audio response data obtained at steps 602 and 604, respectively, and a known speaker frequency response.

At step 608, the spatial audio system computes a filter based on the regularization curve generated at step 606. The filter may be a crosstalk cancellation (XTC) filter. Generating an XTC filter may include generating an XTC filter matrix.

At step 610, the spatial audio system generates spatial audio data using the filter computed at step 608. The spatial audio data generated using the filter reduces inaccuracies in the generated spatial audio resulting from anthropometric crosstalk.

Figure 20:
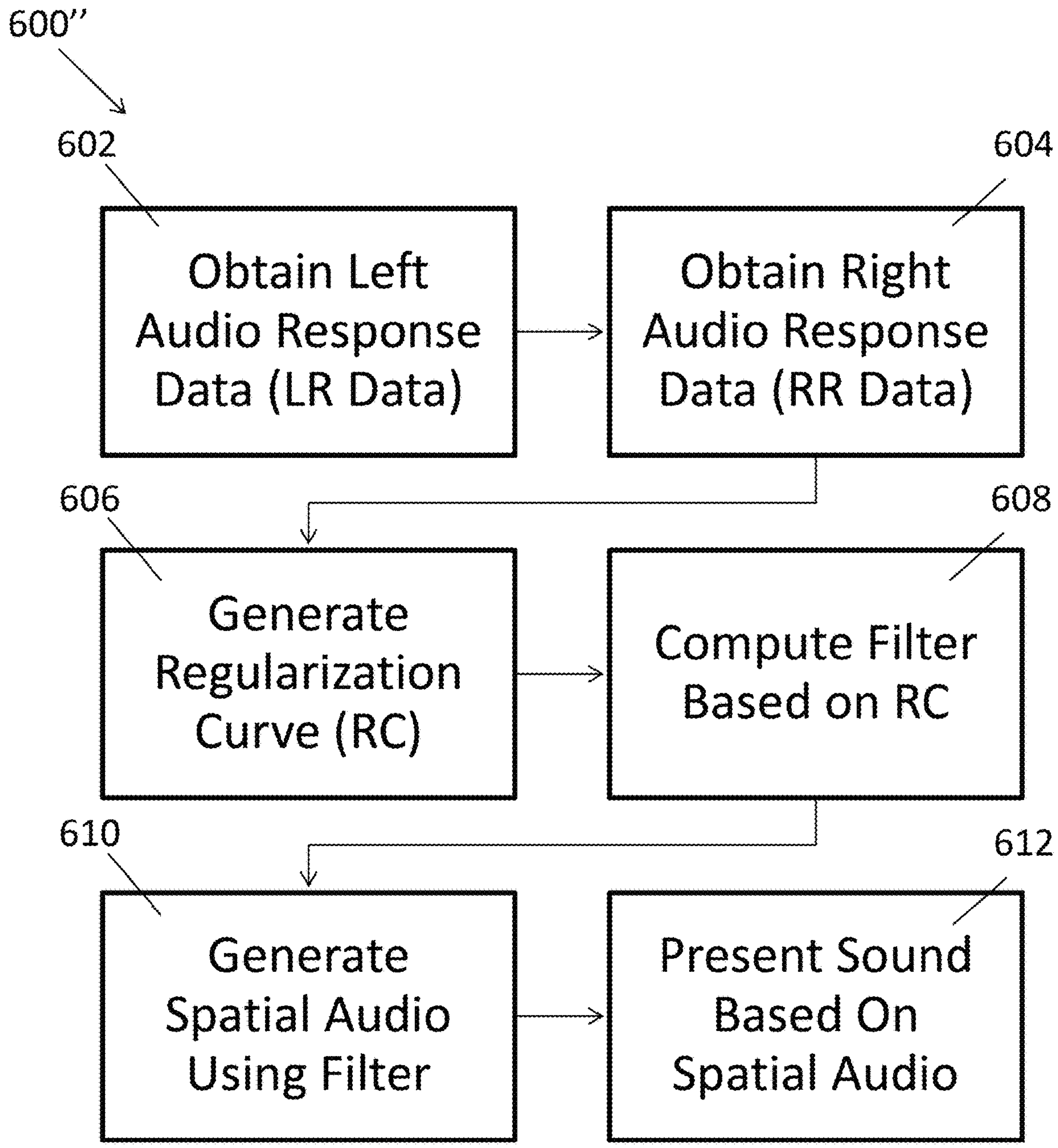

FIG. 20 depicts a method 600' for generating spatial audio for use with speakers coupled to head-mounted display systems at non-zero distances from users' ears according to some embodiments. The method 600' is similar to the method 600 depicted in FIG. 19 and reduces inaccuracies in the generated spatial audio resulting from anthropometric crosstalk. The difference between the methods 600, 600' is that in the method 600' depicted in FIG. 20 at step 612, the spatial audio system presents sound to the user based on the spatial audio data generated at step 610. The presented sound may be part of a spatial audio field and is presented with speakers coupled to display devices at non-zero distances from a user's ears.

Figure 21:
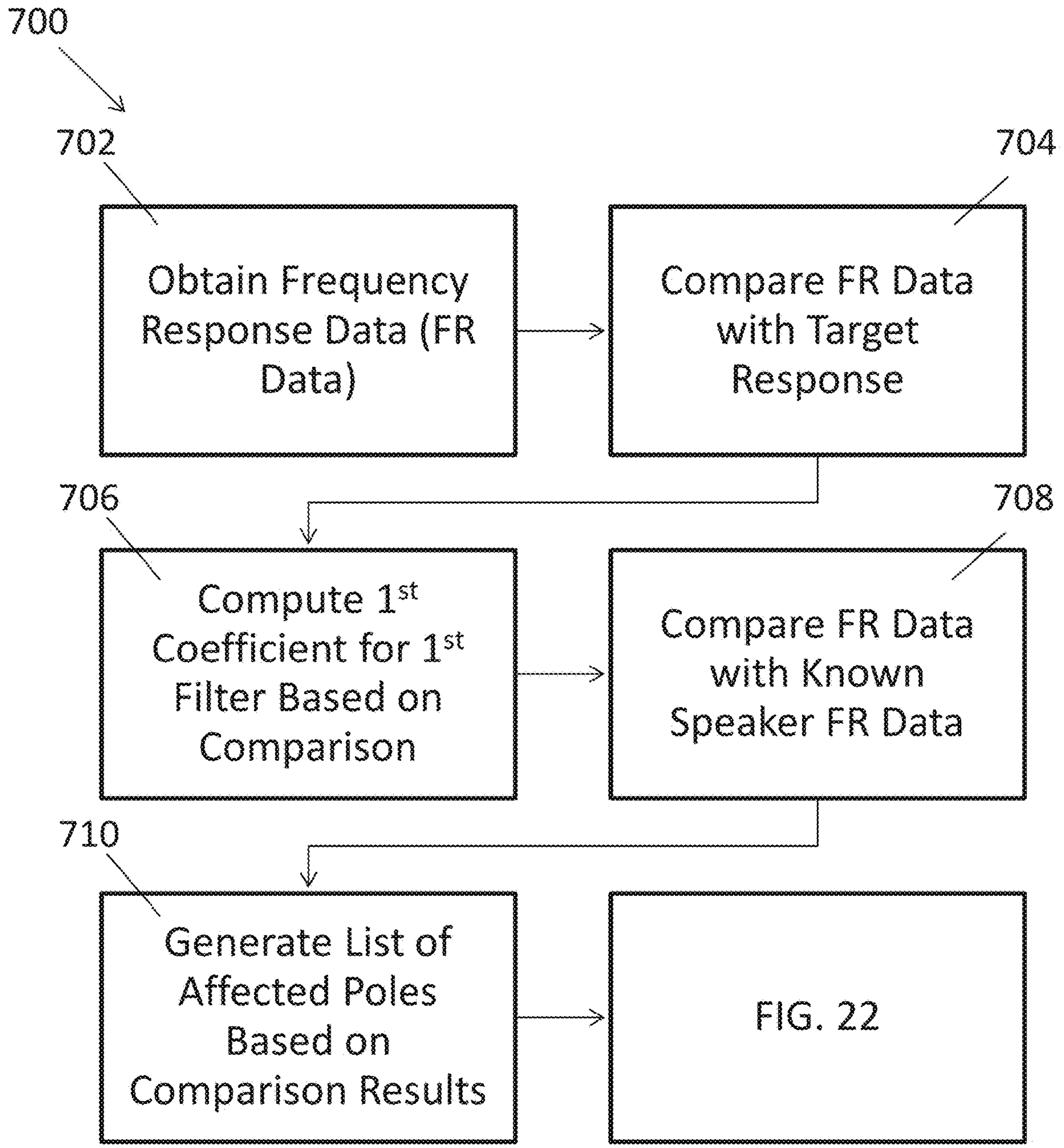
Figure 22:
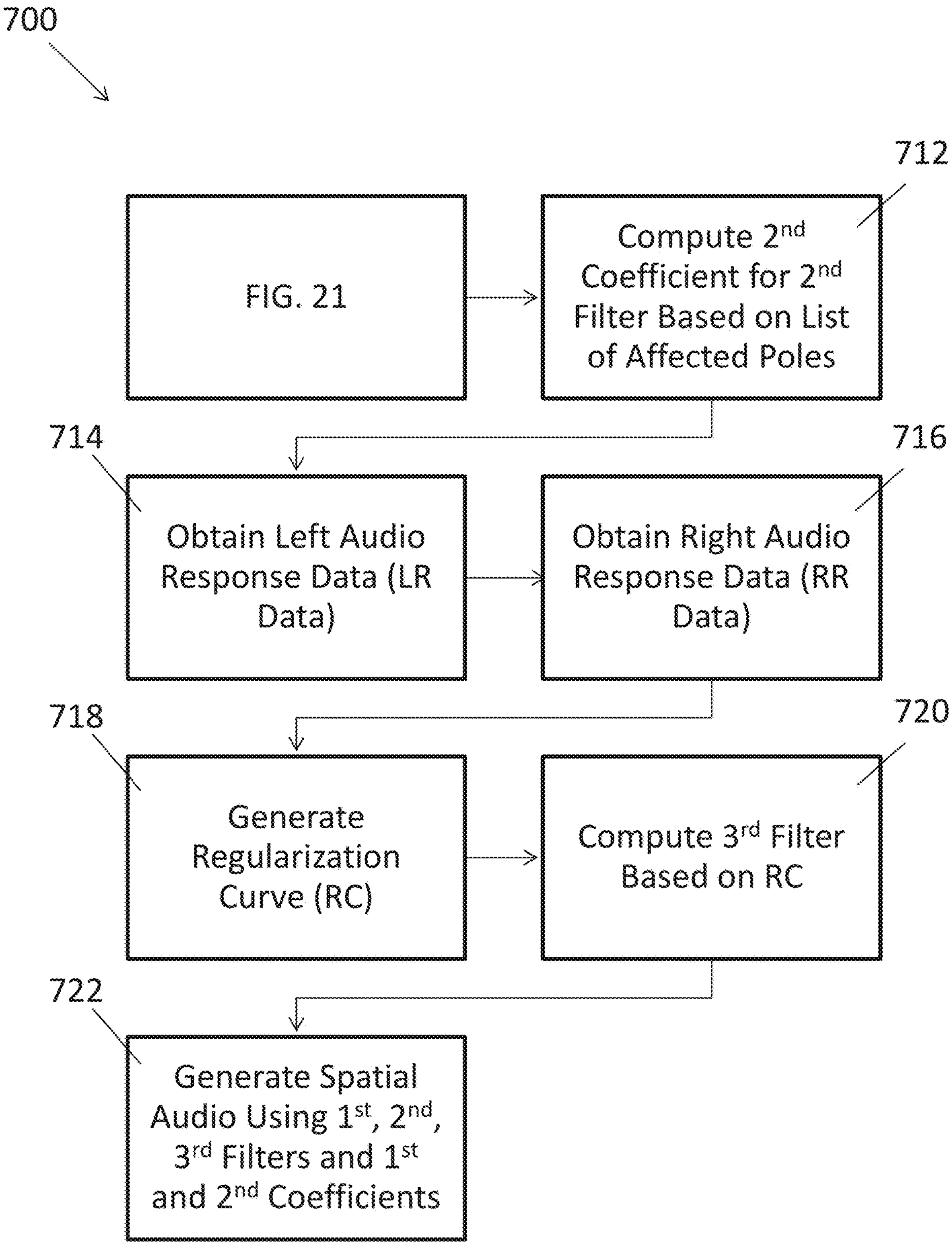

FIGS. 21 and 22 depict a method for generating spatial audio for use with speakers coupled to head-mounted display systems at non-zero distances from users' ears according to some embodiments. The method 600 reduces inaccuracies in the generated spatial audio resulting from (1) characteristics of the speakers and anthropometric crosstalk relating to (2) sound reflection by a user's head and ear pinna and (3) crosstalk.

At step 702, the spatial audio system obtains frequency response data of a speaker. In some embodiments, the frequency response data is measured (e.g., by delivering a known sound through the speaker). In some embodiments, the frequency response data is simulated (e.g., using known characteristics of the speaker).

At step 704, the spatial audio system compares the obtained frequency response data with target frequency response data. Comparing the obtained frequency response data with the target frequency response data may include processing the obtained frequency response data with the target frequency response data with a peak and notch detector.

At step 706, the spatial audio system computes a first coefficient for a first filter based on the results of the comparison at step 704. The first filter may be a parallel infinite impulse response (IIR) and finite impulse response (FIR) combination filter system.

At step 708, the spatial audio system compares the obtained frequency response data with known speaker frequency response data. Comparing the obtained frequency response data with the known speaker frequency response data may include processing the obtained frequency response data with the known speaker frequency response data with a peak and notch detector.

At step 710, the spatial audio system generates a list of affected frequency poles based on the results of the comparison at step 708. The list of affected frequency poles may include a list of frequency poles and respective anthropometric effects for each of the frequency poles in the list of frequency poles. Each of the anthropometric effects may include attenuation or amplification, and a magnitude of the attenuation or amplification.

At step 712, the spatial audio system computes a second coefficient for a second filter based on the list of affected frequency poles generated at step 710. The second filter may be an effect reduction filter that uses the list of frequency poles and respective anthropometric effects to compute coefficients for a parallel infinite impulse response (IIR) and finite impulse response (FIR) combination filter system.

At step 714, the spatial audio system obtains left audio response data of a left speaker. In some embodiments, the left audio response data is measured (e.g., by delivering a known sound through the left speaker). In some embodiments, the left audio response data is simulated (e.g., using known characteristics of the left speaker). The left audio response data includes a response of the left speaker to the left ear and a response of the left speaker to the right ear. The audio response data may include frequency and/or impulse response data.

At step 714, the spatial audio system obtains right audio response data of a right speaker. In some embodiments, the right audio response data is measured (e.g., by delivering a known sound through the right speaker). In some embodiments, the right audio response data is simulated (e.g., using known characteristics of the right speaker). The right audio response data includes a response of the right speaker to the right ear and a response of the right speaker to the left ear. The audio response data may include frequency and/or impulse response data.

At step 718, the spatial audio system generates a regularization curve based on the left and right audio response data obtained at steps 714 and 716, respectively, and a known speaker frequency response.

At step 720, the spatial audio system computes a third filter based on the regularization curve generated at step 606. The third filter may be a crosstalk cancellation (XTC) filter. Generating an XTC filter may include generating an XTC filter matrix.

At step 722, the spatial audio system generates spatial audio data using (1) the first filter and the first coefficient computed at step 706, (2) the second filter and the second coefficient computed at step 712, and (3) the third filter computed at step 720. Using the first filter and the first coefficient reduces inaccuracies in the generated spatial audio resulting from characteristics of the speaker. Using the second filter and the second coefficient reduces inaccuracies in the generated spatial audio resulting from an anthropometric effect relating to sound reflection by a user's head and ear pinna. Using the third filter reduces inaccuracies in the generated spatial audio resulting from anthropometric crosstalk.

System Architecture Overview

Figure 23:
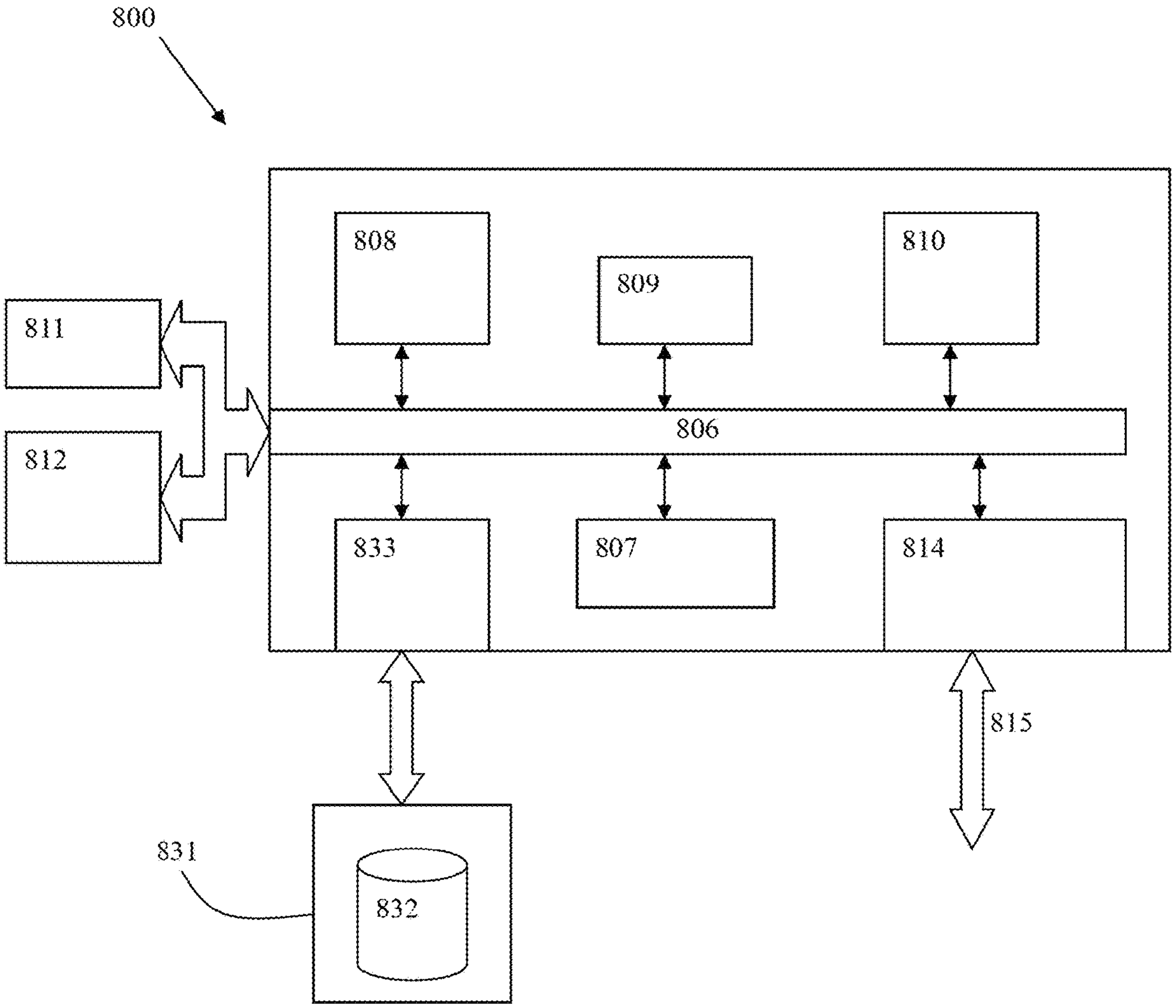
FIG. 23 is a block diagram schematically depicting an illustrative computing system according to some embodiments.

FIG. 23 is a block diagram of an illustrative computing system 800 suitable for implementing an embodiment of the present disclosure. Computer system 800 includes a bus 806 or other communication mechanism for communicating information, which interconnects subsystems and devices, such as processor 807, system memory 808 (e.g., RAM), static storage device 809 (e.g., ROM), disk drive 810 (e.g., magnetic or optical), communication interface 814 (e.g., modem or Ethernet card), display 811 (e.g., CRT or LCD), input device 812 (e.g., keyboard), and cursor control.

According to one embodiment of the disclosure, computer system 800 performs specific operations by processor 807 executing one or more sequences of one or more instructions contained in system memory 808. Such instructions may be read into system memory 808 from another computer readable/usable medium, such as static storage device 809 or disk drive 810. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 807 for execution. Such a medium may take many forms, including but not limited to, non-volatile media and volatile media. Non-volatile media includes, for example, optical or magnetic disks, such as disk drive 810. Volatile media includes dynamic memory, such as system memory 808.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM (e.g., NAND flash, NOR flash), any other memory chip or cartridge, or any other medium from which a computer can read.

In an embodiment of the disclosure, execution of the sequences of instructions to practice the disclosure is performed by a single computer system 800. According to other embodiments of the disclosure, two or more computer systems 800 coupled by communication link 815 (e.g., LAN, PTSN, or wireless network) may perform the sequence of instructions required to practice the disclosure in coordination with one another.

Computer system 800 may transmit and receive messages, data, and instructions, including program, i.e., application code, through communication link 815 and communication interface 814. Received program code may be executed by processor 807 as it is received, and/or stored in disk drive 810, or other non-volatile storage for later execution. Database 832 in storage medium 831 may be used to store data accessible by system 800 via data interface 833.

The above-described systems and methods including audio filters reduce inaccuracies in generated spatial audio. The systems and methods also reduce cognitive dissonance arising from mismatch between spatial auditory cues and visual cues.

While the spatial audio generation and filtering systems and methods 400, 500, 600, 700 described above include specific numbers of audio channels and speakers at specific locations, these numbers and locations are exemplary and not intended to be limiting. While the audio filtering systems and methods 400, 500, 600, 700 described above are described in use with spatial audio generation, these audio filtering systems and methods will improve the fidelity of any audio played through speakers mounted on a head-mounted display device (e.g., an XR display device).

Various exemplary embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A computer implemented method for generating audio for use with a head-mounted display system, comprising:
- obtaining a frequency response data of a speaker coupled to the head-mounted display system;
- comparing the frequency response data of the speaker with a known speaker transducer frequency response data; and
- generating a list of affected frequency poles based on a result of comparing the frequency response data with the known speaker transducer frequency response data;
- computing a coefficient for a filter system based on the list of affected frequency poles; and
- generating the audio using the filter system and the coefficient to reduce an anthropometric effect on the audio.

2. The method of claim 1, wherein the audio is spatial audio.

3. The method of claim 1, wherein the frequency response data includes the anthropometric effect corresponding to an ear of a user.

4. The method of claim 1, wherein the filter system is a parallel Infinite Impulse Response (IIR)—Finite Impulse Response (FIR) filter system.

5. The method of claim 1, further comprising measuring the frequency response data for the speaker.

6. The method of claim 1, further comprising simulating the frequency response data for the speaker.

7. The method of claim 1, further comprising applying a frequency transform to the frequency response data for the speaker.

8. The method of claim 1, further comprising applying a smoothing transform to the frequency response data for the speaker.

9. The method of claim 1, wherein comparing the frequency response data for the speaker with the known speaker transducer frequency response data comprises processing the frequency response data for the speaker and the target speaker response with a peak and notch detector.

* * * * *